United States Patent
Suzuki et al.

(10) Patent No.: US 7,679,334 B2
(45) Date of Patent: Mar. 16, 2010

(54) POWER SUPPLY UNIT AND ELECTRIC APPARATUS

(75) Inventors: Kohei Suzuki, Osaka (JP); Hiroshi Yoshizawa, Osaka (JP); Kohji Yuasa, Osaka (JP); Munehisa Ikoma, Nara (JP)

(73) Assignee: Panasonic Corporation, Osaka (JP)

( * ) Notice: Subject to any disclaimer, the term of this patent is extended or adjusted under 35 U.S.C. 154(b) by 371 days.

(21) Appl. No.: 11/898,957

(22) Filed: Sep. 18, 2007

(65) Prior Publication Data

US 2008/0252259 A1   Oct. 16, 2008

(30) Foreign Application Priority Data

Sep. 22, 2006   (JP)   .............. 2006-256657

(51) Int. Cl.
*H02J 7/00*   (2006.01)
(52) U.S. Cl. ...................... 320/136; 320/135
(58) Field of Classification Search ............... 320/136
See application file for complete search history.

(56) References Cited

U.S. PATENT DOCUMENTS 6,008,626 A * 12/1999 Sato et al. .................. 320/132
6,714,882 B1 * 3/2004 Iwaizono ..................... 702/63
7,472,832 B2 * 1/2009 Lombardi, II .......... 235/462.13
2007/0131268 A1 * 6/2007 Taniguichi et al. .......... 136/205

FOREIGN PATENT DOCUMENTS

WO   WO 2006/064726 A1   6/2006

* cited by examiner

*Primary Examiner*—Edward Tso
*Assistant Examiner*—Ramy Ramadan
(74) *Attorney, Agent, or Firm*—McDermott Will & Emery LLP

(57) ABSTRACT

Provided is a power supply unit for supplying power to an electric apparatus, comprising an indicator unit, an introduction-detecting unit for detecting introduction of the electric apparatus into a vehicle for transportation of the electric apparatus, a voltage-detecting unit for detecting the voltage of the power source, a memory unit for storing a first voltage and a second voltage lower than the first voltage, a judgment unit for determining whether the voltage of the power source detected by the voltage-detecting unit is higher than the first voltage and a forced discharge unit. The forced discharge unit is configured to cause the indicator unit to notify if the electric apparatus is in a state prohibiting introduction into the vehicle and forcibly discharge the power source.

18 Claims, 13 Drawing Sheets

POWER SUPPLY UNIT AND ELECTRIC APPARATUS

BACKGROUND OF THE PRESENT INVENTION

1. Field of the Present Invention

The present invention relates to a power supply unit using a nonaqueous electrolyte secondary battery as its power source and an electric apparatus to which power is supplied from the power supply unit.

2. Description of the Background Art

Along with reduction in size and weight of portable electronic devices, there is an increasing demand recently for light-weight high-energy density nonaqueous electrolyte secondary batteries. The battery has the advantages described above, but, because the electrolyte solution contains a relatively degradable organic solvent, the electrolyte solution may decompose on the positive electrode surface if the battery is left in the fully charged state at high temperature, generating gas, increasing the internal pressure, and possible leading to drastic deterioration in its capacity.

It would be effective to reduce the charge depth (hereinafter, referred to SOC) of nonaqueous electrolyte secondary battery by discharge, for prevention of such troubles. The charge depth, a relative value between 100% at during full charge and 0% at full discharge, is a rate of the charged capacity relative to the rated battery capacity. However, the SOC level of the nonaqueous electrolyte secondary battery is not determined usually when an electric apparatus containing a nonaqueous electrolyte secondary battery as power source is brought into vehicle, and the electric apparatus is often exposed to high temperature (for example during shipment), leading to increased possibility of the problems above. It would become easier for the third person to determine whether the electric apparatus may or may not be brought into vehicle correctly by showing the state of the nonaqueous electrolyte secondary battery accurately.

For that reason, it would be effective to use a power source system that, when a high-SOC lithium-ion secondary battery is left at high temperature, discharge the battery to an SOC in the safe region while sending a message (see WO 2006/064726 pamphlet).

However, the power source system initiates discharge only when the device is brought into vehicle and exposed actually to high temperature, and thus, it was difficult to show the third person that an electric apparatus having a nonaqueous electrolyte secondary battery as power source does not show drastic decrease in capacity when shipped, before it is bought in vehicle. If the temperature regarded as high temperature in the power source system is set lower for more reliable prevention of drastic decrease in capacity, slight heat generation during charge may be regarded falsely as high temperature, prohibiting effective charging and giving a charged battery extremely lower in practical performance under ambient atmosphere.

SUMMARY OF THE PRESENT INVENTION

An object of the present invention, which was made to solve the problems above, is to provide a power supply unit allowing notification to the third person that the electric apparatus is in the state prohibiting introduction into vehicle and conversion of the electric apparatus into the safe state allowing introduction into vehicle, and an eclectic device using the same.

An aspect of the invention is a power supply unit for supply of power to an electric apparatus, comprising an indicator unit, a power source containing a nonaqueous electrolyte secondary battery, an introduction-detecting unit for detecting introduction of the electric apparatus into vehicle for transportation of the electric apparatus, a voltage-detecting unit for detecting the voltage of the power source, a memory unit for storing a first voltage and a second voltage lower than the first voltage, a judgment unit for determining whether the voltage of the power source detected by the voltage-detecting unit is not lower than the first voltage, and a forced discharge unit for causing the indicator unit to notify that the electric apparatus is in the state prohibiting introduction thereof into vehicle and forcibly discharging the power source until the voltage of the power source detected by the voltage-detecting unit reaches the second voltage by supplying power from the power source to the indicator unit, if the voltage of the power source is judged not lower than the first voltage by the judgment unit.

Another aspect of the present invention is an electric apparatus comprising an indicator unit, a power source containing a nonaqueous electrolyte secondary battery, an introduction-detecting unit for detecting introduction of the electric apparatus into vehicle for transportation of the electric apparatus, a voltage-detecting unit for detecting the voltage of the power source, a memory unit for storing a first voltage and a second voltage lower than the first voltage, a judgment unit for determining whether the voltage of the power source detected by the voltage-detecting unit is not lower than the first voltage, if the introduction of the electric apparatus into vehicle is detected previously by the introduction-detecting unit, a forced discharge unit for causing the indicator unit to notify that the electric apparatus is in the state prohibiting introduction thereof into vehicle and forcibly discharging the power source until the voltage of the power source detected by the voltage-detecting unit reaches the second voltage by supplying power from the power source to the indicator unit, if the voltage of the power source is judged not lower than the first voltage by the judgment unit, and an apparatus circuit to which power is applied from the power source.

BRIEF DESCRIPTION OF THE DRAWINGS

FIG. 6 is a flowchart showing the operation of the electric apparatus in the second embodiment when it is turned on.

DETAILED DESCRIPTION OF THE PREFERRED EMBODIMENTS OF THE PRESENT INVENTION

Hereinafter, favorable embodiments of the present invention will be described with reference to attached drawings. The following embodiments are only specific examples of the present inventions, and should not be construed that they restrict the technological scope of the present invention.

Hereinafter, favorable embodiments of the present invention will be described, by using a laptop personal computer as an example of the electric apparatus.

First Embodiment

Figure 1:
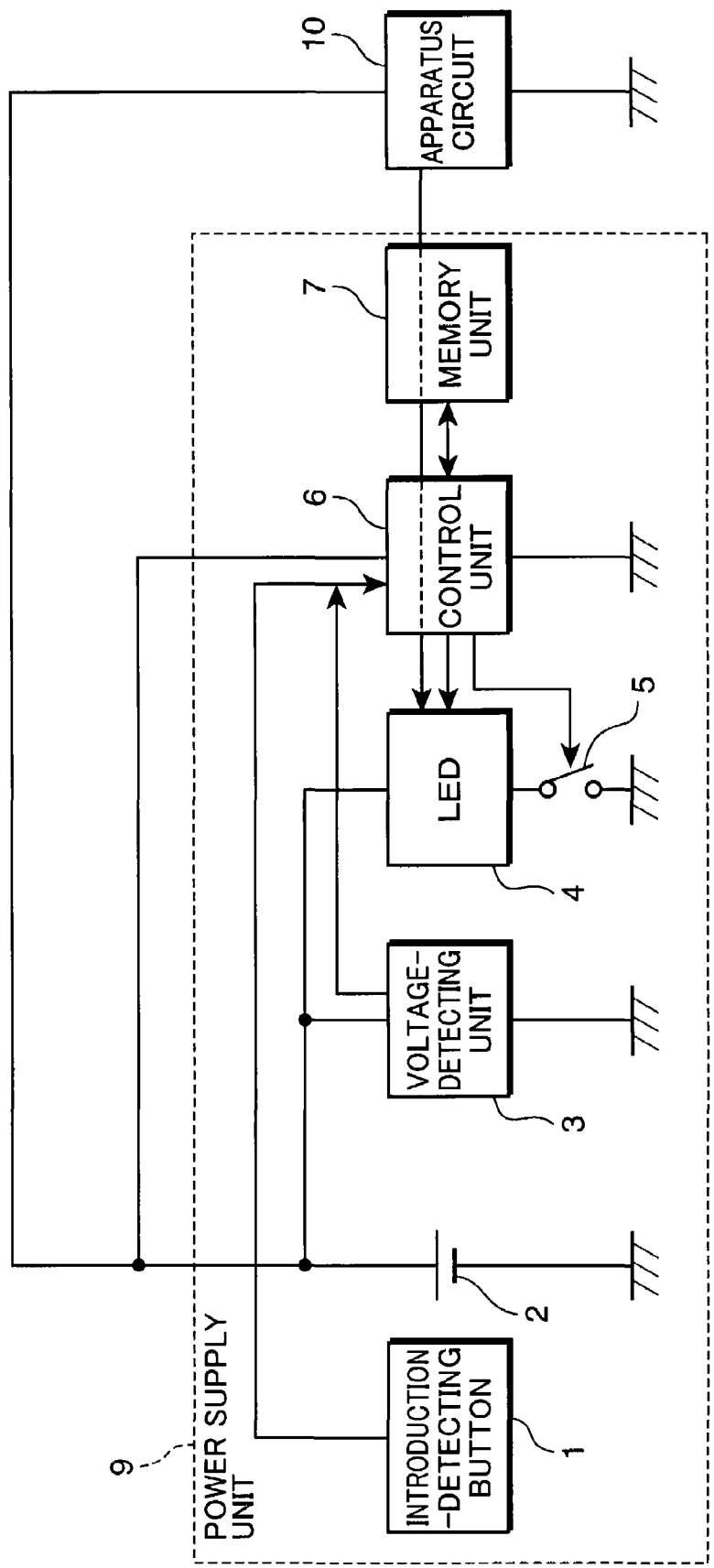
FIG. 1 is a diagram showing an example of the electric apparatus in the first embodiment of the present invention.

FIG. 1 is a diagram showing an example of the electric apparatus in the first embodiment of the present invention. The electric apparatus shown in FIG. 1 has a power supply unit 9 and an apparatus circuit 10. The power supply unit 9 has an introduction-detecting button 1, a power source 2, a voltage-detecting unit 3, a LED (Light Emitting Diode) 4, a switch 5, a control unit 6, and a memory unit 7.

The power source 2 is made with a nonaqueous electrolyte secondary battery. The introduction-detecting button 1, an example of the introduction-detecting unit, is pushed down by an inspector in the inspection before introduction of an electric apparatus into vehicle and outputs data informing to the control unit 6 that the apparatus is brought into the vehicle. The vehicle (transportation means) of transporting electric apparatus include vehicles such as automobile, train, ship, and airplane, and these vehicles include both manned and unmanned vehicles.

The voltage-detecting unit 3, which contains a known voltage-monitoring circuit, measures the voltage V of the power source 2 and sends the measured voltage data to the control unit 6.

The LED 4, an example of the indicator unit, informs the state of the power supply unit as it is turned on. The switch 5 is connected in series to the LED 4 and to the power source 2, and turns on/off power supply from the power source 2 to LED 4. The memory unit 7 stores control-initiating voltage V1 and control-terminating voltage V2. The control-terminating voltage V2 is lower than the control-initiating voltage V1. The control-initiating voltage V1 corresponds to an example of the first voltage, and the control-terminating voltage V2, to an example of the second voltage.

The control unit 6 has, for example, a microcomputer and judges whether the voltage V of the power source 2 detected by the voltage-detecting unit 3 is not lower than the control-initiating voltage V1 when introduction of the electric apparatus into vehicle is detected previously by the introduction-detecting button 1. When the voltage V of the power source 2 is judged not lower than the control-initiating voltage V1, the control unit 6 allows power supply from the power source 2 to the LED 4, informs the LED 4 that the electric apparatus is in the state not allowing introduction into the vehicle, and discharges the power source 2 forcibly until the voltage V of the power source 2 detected by the voltage-detecting unit 3 reaches the control-terminating voltage V2. The control unit 6 controls on/off of the switch 5, based on the data sent from the introduction-detecting button 1 and the voltage-detecting unit 3 and also on the data stored in the memory unit 7. The power source 2 supplies power to the LED 4, the control unit 6 and the apparatus circuit (hereinafter, circuit) 10 of the personal computer (electric apparatus).

If the voltage V of power source 2 detected by the voltage-detecting unit 3 is lower than the control-initiating voltage V1 (voltage V<control-initiating voltage V1), the control unit 6 turns the switch 5 on and causes the LED 4 to notify that the power source 2 is in the state allowing introduction into the vehicle. Alternatively if the voltage V of power source 2 detected by the voltage-detecting unit 3 is not lower than the control-initiating voltage V1 (voltage V≧control-initiating voltage V2), the control unit 6 notices that the power source 2 is in the state demanding forcible discharge, turns the switch 5 on, and discharges the power source 2 forcibly by application of power from the power source 2 to the LED 4. The power source 2 is discharged progressively by forced discharge (continuous notification), and the control unit 6 discontinues the forced discharge by turning the switch 5 off when the voltage V reached the control-terminating voltage V2. When the introduction-detecting button 1 is pushed down, the control unit 6 turns the switch 5 on even if the power source 2 is unused.

A voltage at which the nonaqueous electrolyte secondary battery decomposes under high-temperature environment is previously set to the control-initiating voltage V1, and a voltage at which the nonaqueous electrolyte secondary battery does not decompose under high-temperature environment is set to the control-terminating voltage V2. Preferably, the control-initiating voltage V1 is a value of 45% or more and 55% or less as SOC, and the control-terminating voltage V2 a value of 25% or more and 35% or less as SOC. The nonaqueous electrolyte secondary battery, which contains lithium complex oxide (e.g., lithium cobaltate and lithium nickelate) as the positive electrode and a lithium-occluding/releasing material (e.g., graphite and silicon compounds) as the negative electrode, shows varying voltage, depending on the combination. However, independently of the battery voltage, it is possible to prevent drastic decrease in capacity during introduction, if SOC is in the range described above.

In the present embodiment, the LED 4 corresponds to an example of the indicator unit; the power source 2, to an example of the power source; the introduction-detecting button 1, to an example of the introduction-detecting unit; the voltage-detecting unit 3, to an example of the voltage-detecting unit; the memory unit 7, to an example of the memory unit; the control unit 6, to an example of the judgment unit; the control unit 6 and the LED 4, to examples of the forced discharge unit; the control unit 6, to an example of the notification control unit; the switch 5, to an example of the switch; and the control unit 6, to an example of the discharge control unit.

Figure 2:
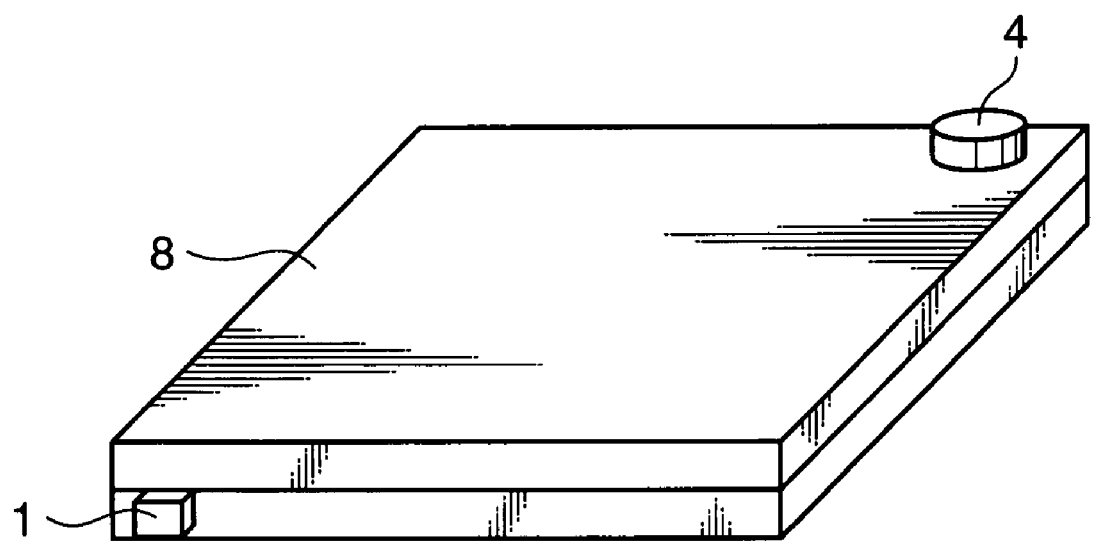
FIG. 2 is a perspective appearance view illustrating a personal computer using the power supply unit in the first embodiment of the present invention.

FIG. 2 is a perspective external view of a personal computer using the power supply unit in the first embodiment of the present invention. In FIG. 2, a LED (lamp) 4, an example of the indicator unit, is placed on the top face of the personal computer 8. An introduction-detecting button 1, an example of the introduction-detecting unit, is placed on the side wall of the personal computer 8.

Power supply is initiated from the power source 2 (not shown in FIG. 2) to the personal computer 8, when the inspector pushes the introduction-detecting button 1 down in the inspection before introduction thereof into vehicle. If the voltage V detected by the voltage-detecting unit 3 is lower than the control-initiating voltage V1 previously stored in the memory unit 7, the LED 4 is turned on for a particular time, indicating that the power source 2 is in the state allowing introduction. On the other hand, if the voltage V is not lower than the control-initiating voltage V1, the LED 4 is turned on, indicating that the power source 2 is in the state demanding forced discharge.

The notification (LED 4 turned on) when the voltage V is lower than the control-initiating voltage V1 may be only for a short period of time, but the notification when the voltage V is not lower than the control-initiating voltage V1 should be continued until the voltage V reaches the control-terminating voltage V2. The notification when the voltage V is lower than the control-initiating voltage V1 indicates that the condition is favorable at the moment, while the notification when the voltage V is not lower than the control-initiating voltage V1 that the condition is unfavorable at the moment. Thus, the notification patterns are favorably different from each other, for example as "continuous lighting" and "flashing". Thus for example, notification demanding forced discharge immediately before introduction indicates the owner of the personal computer 8 or the third person that the personal computer 8 is not to be installed in the vehicle.

In this way, the control unit 6 notifies that the electric apparatus is in the state allowing introduction into vehicle in a manner different from that of LED 4 when the power source 2 is discharged forcibly. Accordingly, the third person judges easily whether the electric apparatus is to be installed into the vehicle, by confirming the notification pattern of LED 4.

Figure 3:
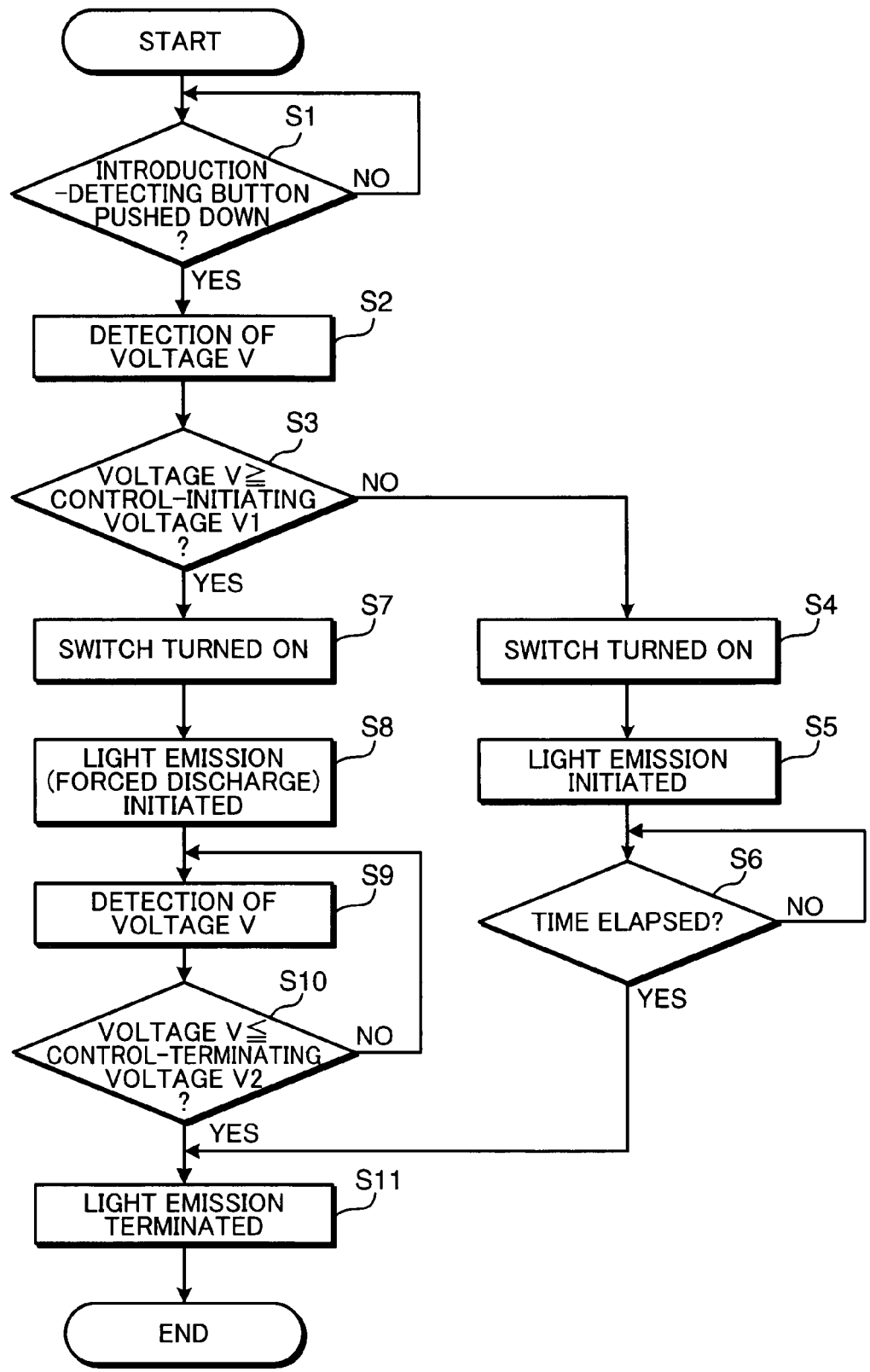
FIG. 3 is a flowchart showing the control algorithm of the power supply unit in the first embodiment.

Hereinafter, the operation of the power supply unit in first embodiment will be described. FIG. 3 is a flowchart showing the control algorithm of the power supply unit in first embodiment.

First in step S1, the control unit 6 judges whether the introduction-detecting button 1 is pushed down. If the introduction-detecting button 1 is pushed down by the inspector before the personal computer is introduced into the vehicle, a detection signal is outputted from the introduction-detecting button 1 to the control unit 6. Upon receipt of the detection signal from the introduction-detecting button 1, the control unit 6 judges that the introduction-detecting button 1 is pushed down. If it is judge that the introduction-detecting button 1 is not pushed down (NO in step S1), the judgment processing in step S1 is repeated at a particular time interval until the introduction-detecting button 1 is pushed down.

On the other hand, if it is judged that the introduction-detecting button 1 is pushed down (YES in step S1), the voltage-detecting unit 3 detected the voltage V of power source 2, and the control unit 6 acquires the voltage V detected by the voltage-detecting unit 3 in step S2.

Then in step S3, the control unit 6 judges whether the voltage V detected by the voltage-detecting unit 3 is not lower than the control-initiating voltage V1 previously stored in the memory unit 7. If the voltage V is judged lower than the control-initiating voltage V1 (NO in step S3), the control unit 6 turns the switch 5 on in step S4. Then in step S5 the control unit 6 outputs a control signal to LED 4 and turns LED 4 on. The control unit 6 then outputs a control signal, to make the LED 4 flash at a particular time interval. The LED 4 emits light according to the control signal inputted from the control unit 6, and initiates notification that the power source 2 is satisfactory at the present moment.

Then in step S6, the control unit 6 judges whether the time elapsed for a particular time. The particular time is the period of LED 4 being turned on, and a relatively short period but recognizable for the third person, for example 10 seconds, is selected. If the time does not elapse for a particular time (No in step S6), the judgment processing in step S6 is repeated until the time elapsed for a particular time.

On the other hand, if the voltage V is judged not lower than the control-initiating voltage V1 (YES in step S3) in step S3, the control unit 6 turns the switch 5 on in step S7. Then in step S8, the control unit 6 outputs a control signal to the LED 4, turning on the LED 4. The control unit 6 then output a control signal for turning on the LED 4 consistently. The LED 4 emits light, based on the control signal inputted from the control unit 6, initiating notification that power source 2 is unsatisfactory at the present moment. In this way, the power source 2 is discharged forcibly, while the LED 4 is turned on.

Then in step S9, the voltage-detecting unit 3 detects the voltage V of power source 2, and the control unit 6 acquires the voltage V detected by the voltage-detecting unit 3. Then in step S10, the control unit 6 judges whether the voltage V detected by the voltage-detecting unit 3 is not higher than the control-terminating voltage V2 previously stored in the memory unit 7. If the voltage V is judged higher than the control-terminating voltage V2 (NO in step S10), the procedure goes back to step S7, and the voltage-detecting unit 3 detects the voltage V of power source 2. In this way, the voltage-detecting unit 3 continues monitoring even during the forced discharge (continuous notification).

If the voltage V is judged not higher than the control-terminating voltage V2 in step S10 (YES in step S10), or if it is judged that the time elapsed for a particular time in step S6 (YES in step S6), in step S11 the control unit 6 turns off the switch 5, and terminates light emission of the LED 4 and forced discharge.

As described above, the power supply unit 9 in the present embodiment measures the voltage V of power source 2 after operation of the introduction-detecting button 1, and discharges the power source 2 as needed automatically forcibly, after confirming whether the electric apparatus is in the state allowing introduction into vehicle.

Thus when introduction of the electric apparatus in vehicle is detected previously, it is judged whether the voltage V of the power source 2 containing a nonaqueous electrolyte secondary battery is not lower than the control-initiating voltage V1. If the voltage V of power source 2 is judge not lower than the control-initiating voltage V1, power is supplied from the power source 2 to the LED 4, notifying that the electric apparatus is in the state prohibiting introduction into vehicle, and the power source 2 is discharged forcibly until the voltage V of power source 2 reaches the control-terminating voltage V2, which is lower than the control-initiating voltage V1.

As a result, power is supplied from the power source 2 to the LED 4, and the electric apparatus is discharged forcibly, and thus, it is possible to notify the third person that the electric apparatus is in the state prohibiting introduction into vehicle and also to make the electric apparatus in the state allowing safe introduction into vehicle.

If the voltage V of power source 2 is judged lower than the control-initiating voltage V1, power is supplied from the power source 2 to the LED 4 for a particular time, notifying that the electric apparatus is in the state allowing introduction into vehicle. Thus, it is possible to inform the third person previously that the electric apparatus is in the state resistant to deterioration when installed in the vehicle.

If the voltage V of power source 2 is judged not lower than the control-initiating voltage V1, power is supplied from the automatically power source 2 to the LED 4, notifying that the electric apparatus is in the state prohibiting introduction into vehicle, and the power source 2 is discharged forcibly until the voltage V of power source 2 reaches the control-terminating voltage V2. Thus, because power is supplied from the automatically power source 2 to the LED 4, it is possible to eliminate the labor of the operator.

In the present embodiment, if the voltage V of power source 2 is judged not lower than the control-initiating voltage V1, power is supplied from the automatically power source 2 to LED 4 and the power source 2 is discharged forcibly until the voltage V of power source 2 detected by the voltage-detecting unit 3 reaches the control-terminating voltage V2, but the present invention is not particularly restricted thereby. If the voltage V of power source 2 is judged not lower than the control-initiating voltage V1, power may be supplied from the power source 2 to the LED 4, by notifying the user to turn on the switch 5 manually, and the power source 2 be discharged forcibly until the voltage V of power source 2 detected by the voltage-detecting unit 3 reaches the control-terminating voltage V2.

Yet alternatively, power supply from the power source 2 to LED 4 is turned on/off by the switch 5. When introduction in the vehicle is detected previously, the switch 5 is turned on, and when the voltage V of power source 2 reaches the control-terminating voltage V2, the switch 5 is turned off. In this way, it is possible to control power supply from the power source 2 to LED 4 easily by turning the switch 5 on/off.

Second Embodiment

Figure 4:
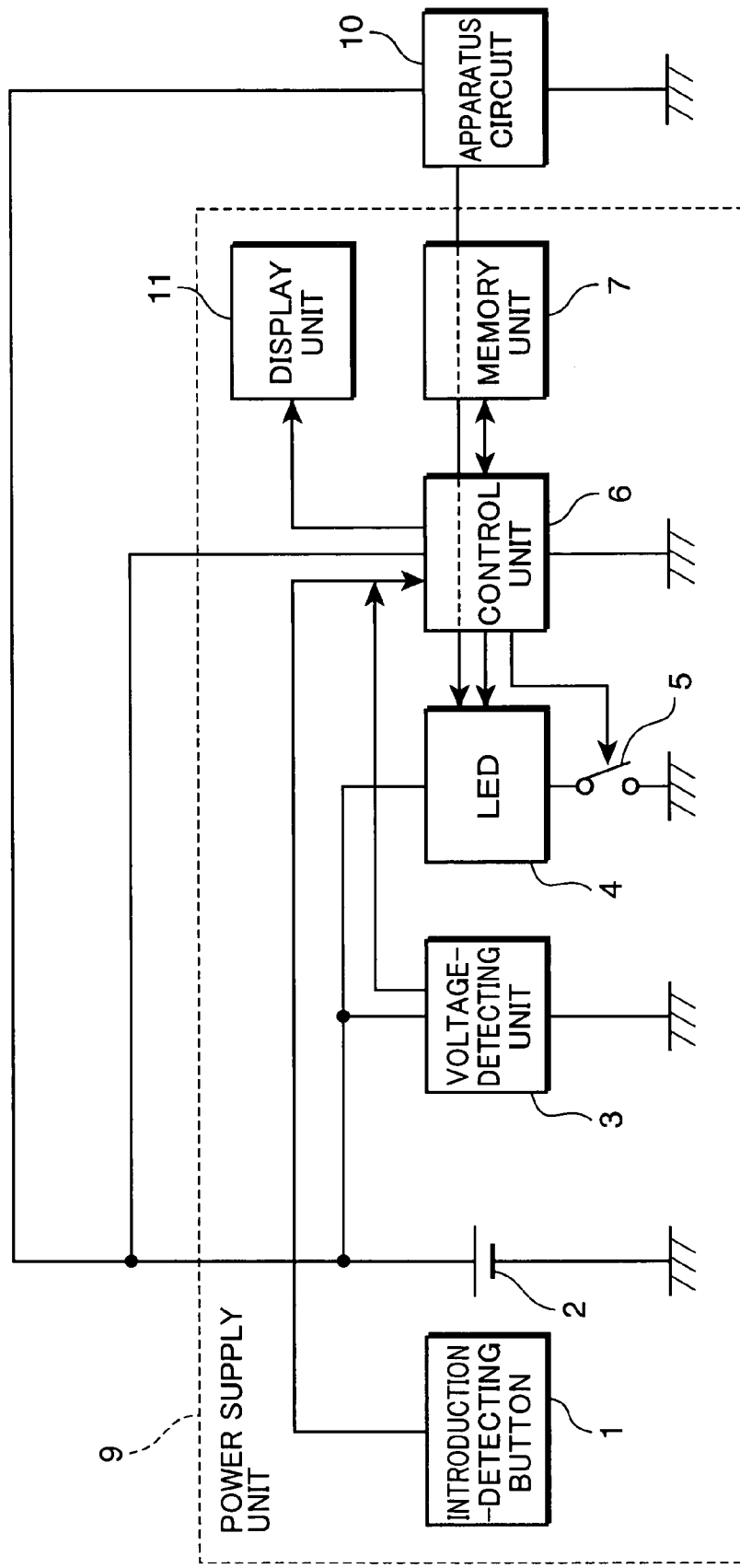
FIG. 4 is a diagram showing an example of the electric apparatus in the second embodiment.

Hereinafter, the power supply in the second embodiment of the present invention will be described. FIG. 4 is a circuit diagram showing an example of the electric apparatus in the second embodiment. The electric apparatus shown in FIG. 4 has a power supply unit 9 and an apparatus circuit 10. The power supply unit 9 has an introduction-detecting button 1, a power source 2, a voltage-detecting unit 3, a LED 4, a switch 5, a control unit 6, a memory unit 7, and a display unit 11. The appearance of the personal computer, an example of the electric apparatus having the power supply unit, is the same as that shown in FIG. 2. In addition, the components in the second embodiment are indicated by the numerals same as those for the components in the first embodiment, and duplicated description is omitted.

After completion of forced discharge, the control unit 6 stores discharge completion data indicating that forced discharge of the memory unit 7 was complete. If the discharge completion data indicating completion of the forced discharge is stored in the memory unit 7 when the power source 2 is in use, the control unit 6 causes the display unit 11 to display a message that the forcible discharge was complete.

The voltage V of power source 2 declines after completion of the forced discharge, and, for example, if a third person turns on the electric apparatus, the operating time of the electric apparatus becomes shortened. In such a case, the user may consider mistakenly that the operating time of the electric apparatus is shortened by defect of the power source 2. Thus in the second embodiment, the memory unit 7 stores the data that the forced discharge was complete and displays that the forced discharge was complete when the power source 2 is in use again. Thus, the user knows that the electric apparatus is in order. Thus, the user can avoid unneeded battery exchange.

Figure 5:
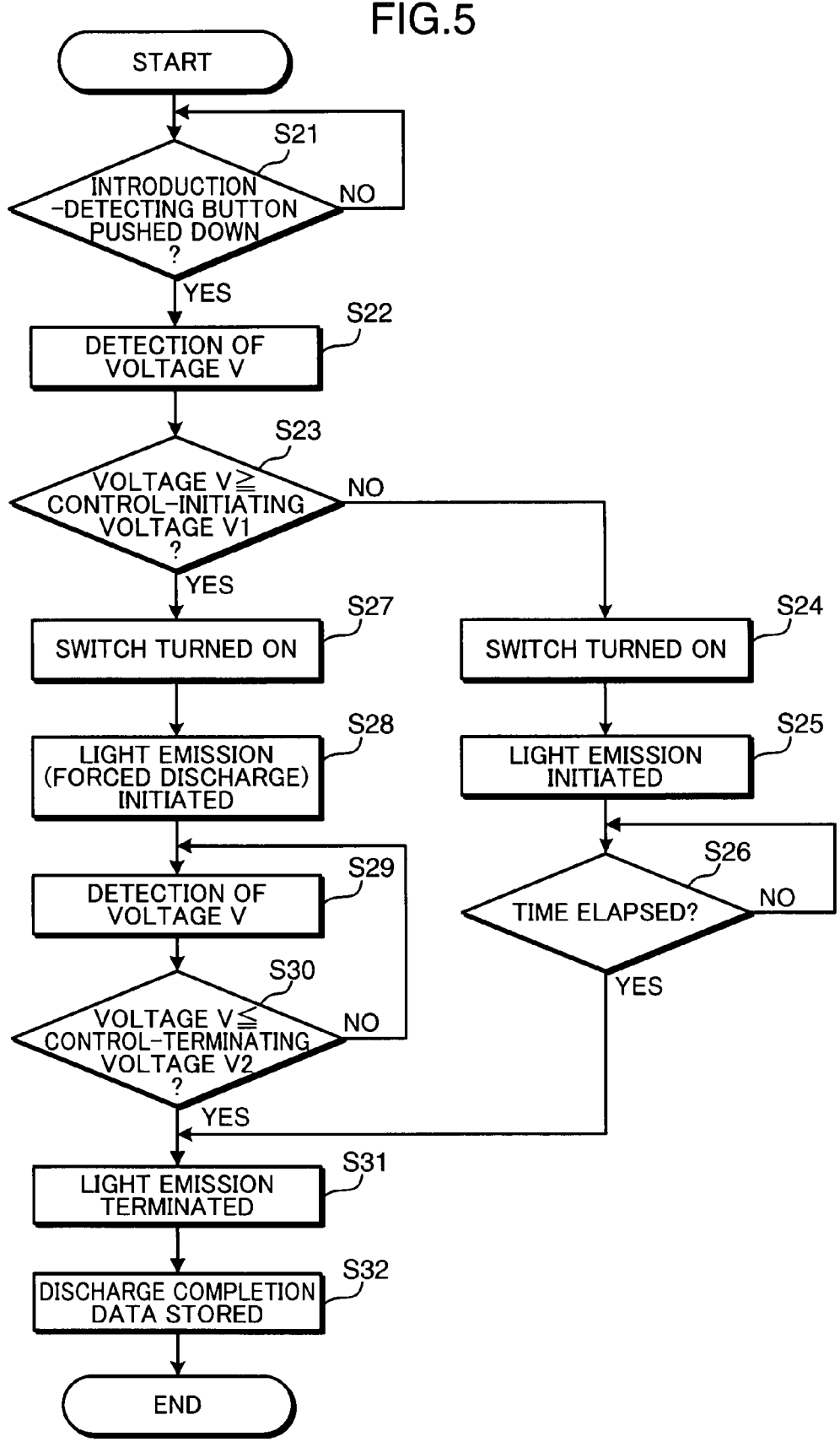
FIG. 5 is a flowchart showing the control algorithm of the power supply unit in the second embodiment.

The operation of the power supply unit in the second embodiment will be described below. FIG. 5 is a flowchart showing the control algorithm of the power supply unit in the second embodiment. Processings in steps S21 to S31 for the power supply unit in second embodiment shown in FIG. 5 are the same as those in steps S1 to S11 for the power supply unit in first embodiment shown in FIG. 3, and thus, duplicated description is omitted. In step S32, when forcible discharge is performed, the control unit 6 stores the discharge completion data indicating that the forcible discharge was complete in the memory unit 7.

Figure 6:
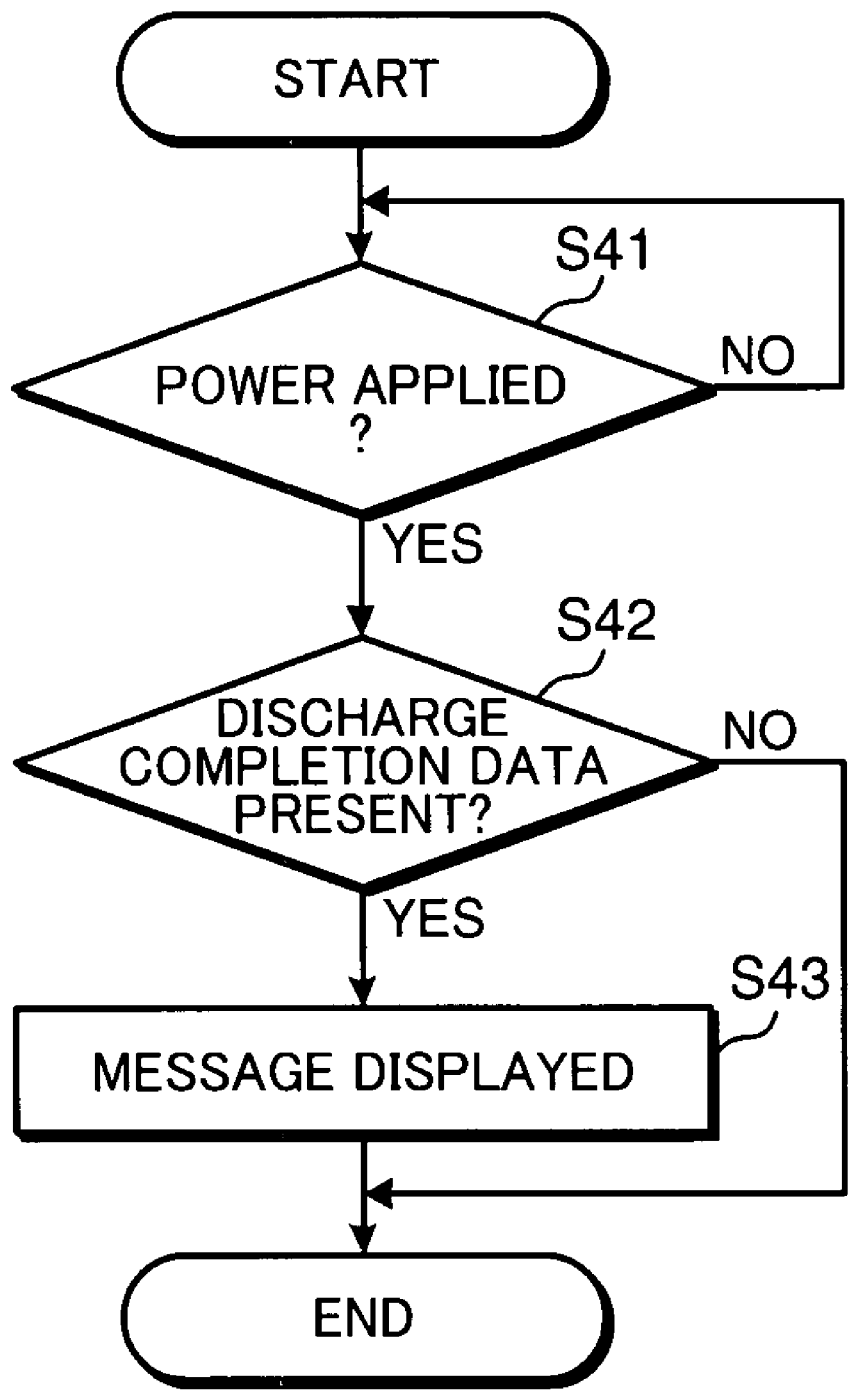

Hereinafter, the operation of the electric apparatus in second embodiment when power is applied will be described. FIG. 6 is a flowchart showing the operation of the electric apparatus in second embodiment when power is applied.

First in step S41, the control unit 6 judges whether the power switch is pushed down and the power is applied. If the introduction-detecting button 1 functions also as a power switch, the introduction-detecting button 1 is pushed down. If it is judged that the power is not applied (NO in step S41), the judgment processing in step S41 is repeated.

On the other hand, if it is judged that the power is applied (YES in step S41), the control unit 6 judges in step S42 whether the discharge completion data is stored in the memory unit 7. If the discharge completion data is judged not stored in the memory unit 7 (NO in step S42), the processing is terminated, as the forced discharge was not performed.

On the other hand, if the discharge completion data is judged stored in the memory unit 7 (YES in step S42), the control unit 6, in step S43, causes the display unit 11 to display a message that the forcible discharge was performed. The display unit 11 displays a message that the forcible discharge was performed. The user knows whether the forcible discharge was performed by examining the message displayed in the display unit 11.

The control unit 6, after displaying the message in the display unit 11, may erase the discharge completion data stored in the memory unit 7 or store it as history. When the message is stored as history, if the user happens to ignore the first message, it is possible for the user to confirm again whether the drop in SOC of the power source 2 is caused by forced discharge. Accordingly, there is less concern about the user considering the deterioration in SOC caused by forced discharge, as a result of nonconformity of the power source 2. The history is preferably erased manually by the user.

In the case of a personal computer, a display panel may be used as an example of the display unit 11, but the display unit is not limited thereto, if it can notify the user of the forced discharge, for example, by character, change in color tone, or sound. From the viewpoint above, the LED 4 may also function as the display unit 11, and the fact that forcible discharge was performed may be notified by emission of the LED 4.

In the description above, the forced discharge unit has a control unit 6 and a switch 5, but the present invention is not particularly limited thereto, and the switch 5 may be configured to be a switching element formed on the same circuit board as the control unit 6.

In this way, discharge completion data indicating discharge completion is stored in the memory unit 7 after when forcible discharge of the power source 2 is complete, and a message based on the discharge completion data is displayed in the display unit 11 when power is applied to the electric apparatus. Thus, the user knows that the shortening of the operating time of the electric apparatus is not caused by trouble of the power source 2, possibly removing unneeded exchange of battery by the user.

Third Embodiment

Figure 7:
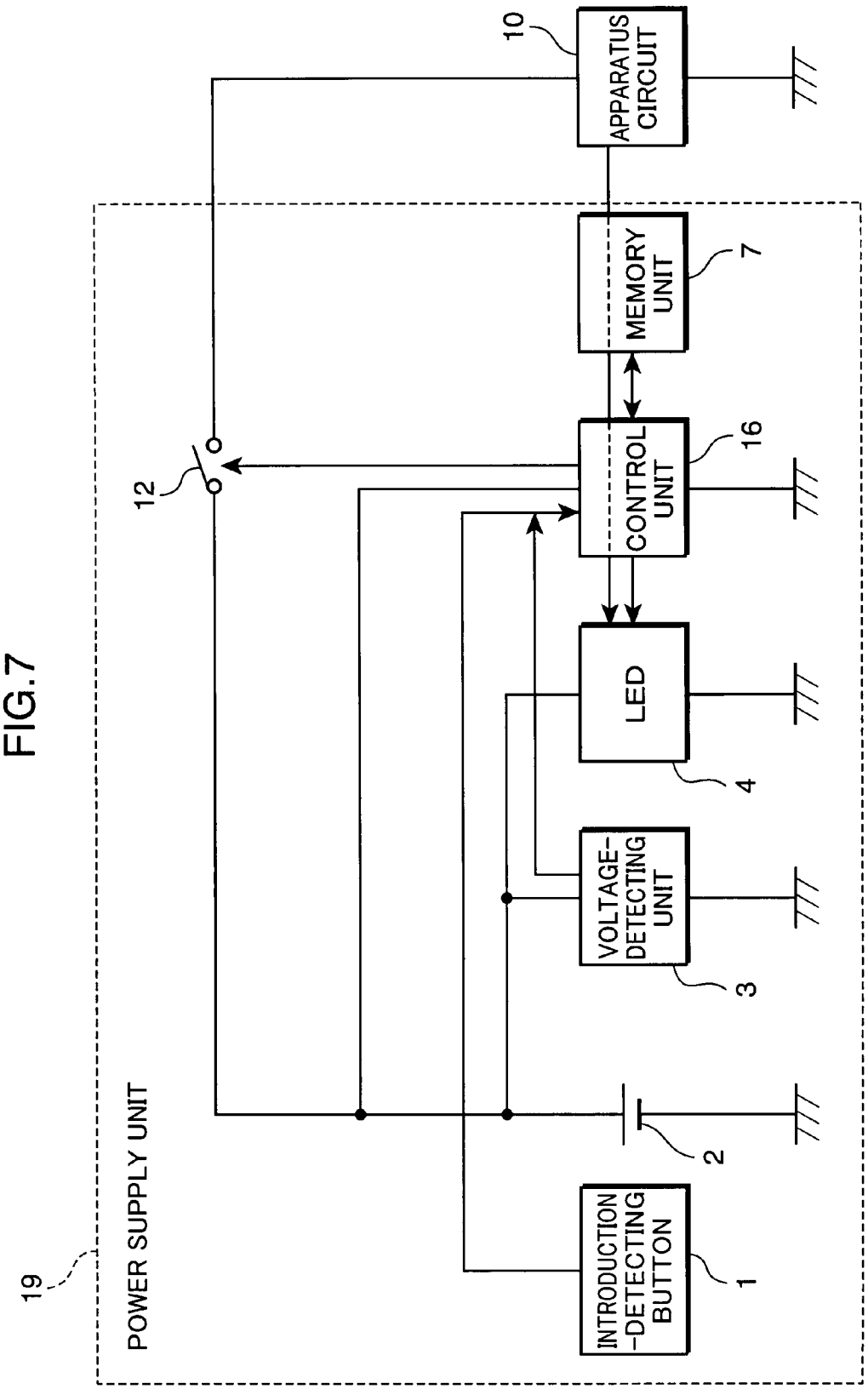
FIG. 7 is a diagram showing an example of the electric apparatus in the third embodiment.

Hereinafter, the power supply unit in the third embodiment of the present invention will be described. FIG. 7 is a circuit diagram showing an example of the electric apparatus in the third embodiment. The electric apparatus shown in FIG. 7 has a power supply unit 19 and an apparatus circuit 10. The power supply unit 19 has an introduction-detecting button 1, a power source 2, a voltage-detecting unit 3, an LED 4, a control unit 16, a memory unit 7, and a switch 12. The appearance of the personal computer, an example of the electric apparatus having a power supply unit, is the same as that shown in FIG. 2. In addition, the components in the third embodiment are indicated by the numerals same as those for the components in the first embodiment, and duplicated description is omitted.

The power supply unit 19 in the third embodiment is different from the power supply unit 9 in the first embodiment in that there is no switch 5 and the power source 2 supplied power to the apparatus circuit 10 via the switch 12 controlled by the control unit 16. When the user uses the electric apparatus, the switch 12 is turned on, in synchronous with the power switch (not shown in the figure) of the electric apparatus.

The control unit 16 causes the LED 4 to notify that the power source 2 is ready to be introduced into vehicle, if the voltage V of power source 2 detected by the voltage-detecting unit 3 is lower than the control-initiating voltage V1 (voltage V<control-initiating voltage V1).

Alternatively if the voltage V of power source 2 detected by the voltage-detecting unit 3 is not lower than control-initiating voltage V1 (voltage V≧control-initiating voltage V1); the control unit 6 notices that the power source 2 is in the state demanding forcible discharge and causes the LED 4 to notify that the power source 2 is not ready to be introduced into vehicle, and turns on the switch 12, and discharges the power source 2 forcibly by allowing current flow from the power source 2 to the apparatus circuit 10. After progress of the discharge of power source 2 by the forced discharge (continuous notification), the control unit 6 turns off the switch 12 and terminates the forced discharge when the voltage V reaches the control-terminating voltage V2. When the introduction-detecting button 1 is pushed down, the control unit 16 turns on the switch 12 even when the power source 2 is in the non-use state.

Thus, the control unit 16 and the switch 12 constitute a forced discharge unit of discharging the power source 2 forcibly. The control unit 16 may send a signal to the apparatus circuit 10, and the apparatus circuit 10 may notify the fact to the LED 4.

The control unit 16 turns off the switch 12, when the voltage V of power source 2 detected by the voltage-detecting unit 3 reaches the control-terminating voltage V2. Thus, it is possible to prevent undesirable decrease in residual capacity of the power source 2 after completion of the forced discharge.

Figure 8:
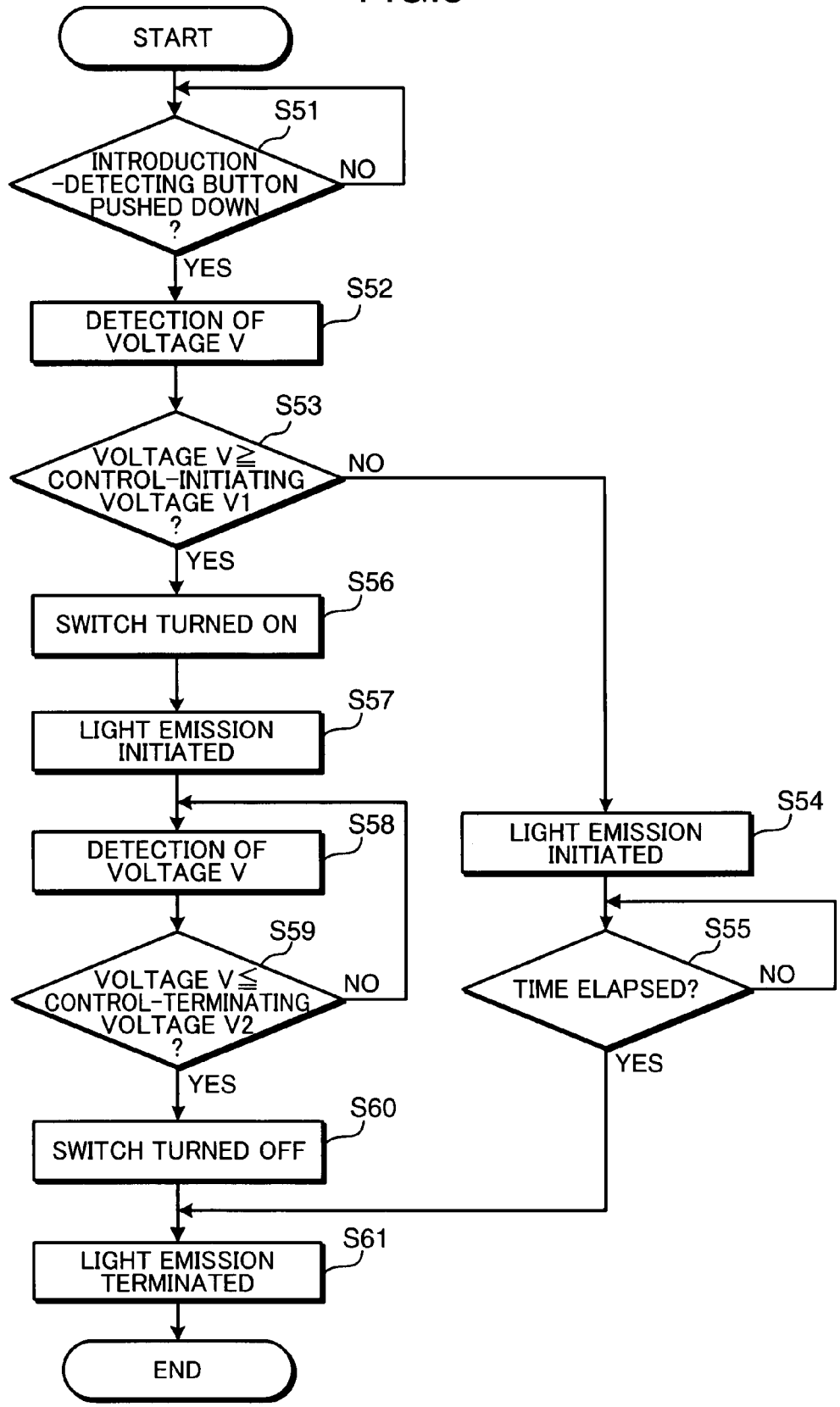
FIG. 8 is a flowchart showing the control algorithm of the power supply unit in the third embodiment.

Hereinafter, the operation of the power supply unit in the third embodiment will be described. FIG. 8 is a flowchart showing the control algorithm of the power supply unit in the third embodiment.

The processing in steps S51 to S53 in the power supply unit of the third embodiment shown in FIG. 8 are the same as those in steps S1 to S3 in the power supply unit of the first embodiment shown in FIG. 3, and thus, description thereof is omitted.

If the voltage V is judged lower than the control-initiating voltage V1 (NO in step S53), the control unit 6 turns on the LED 4 by outputting a control signal to the LED 4 to which power is supplied from the power source 2 in step S54. The processing in step S55 of FIG. 8 is the same as the processing in the step S6 of FIG. 3, and the duplicated description is omitted.

If the voltage V is judge to be not lower than the control-initiating voltage V1 in step S53 (YES in step S53), the control unit 6 turns on the switch 12 in step S56. When the switch 12 is turned on, power is supplied to the apparatus circuit 10 from the power source 2, allowing forcible discharge of the power source 2.

Then in step S57, the control unit 6 turns on the LED 4 by outputting a control signal from the power source 2 to the LED 4 to which power is supplied. In this way, the forcible discharge of the power source 2 proceeds further, while the LED 4 is turned on. The processings in steps S58 and S59 of FIG. 8 are the same as those in steps S9 and S10 of FIG. 3, and duplicated description is omitted.

If the voltage V is judge not higher than the control-terminating voltage V2 in step S59 (YES in step S59), the control unit 6 turns off the switch 12, terminating supply of power to the apparatus circuit 10 and forced discharge in step S60.

When the switch 12 is turned off in step S60 or it is judged that the time elapsed for a particular time in step S55 (YES in step S55), the control unit 6 terminates emission of the LED 4 in step S61.

In this way, power supply from the power source 2 to the electric apparatus is regulated by the switch 12. If introduction into the vehicle is detected previously, when the power supply from the power source 2 to the electric apparatus is turned off, the switch 12 is turned on. Thus, it is possible to control power supply from the power source 2 to the electric apparatus, by turning the switch 12 on and off.

Because the switch 12 is turned off when the voltage V of power source 2 reaches the control-terminating voltage V2, it is possible to prevent undesirable reduction of the residual capacity of power source 2 after completion of the forced discharge.

Fourth Embodiment

Figure 9:
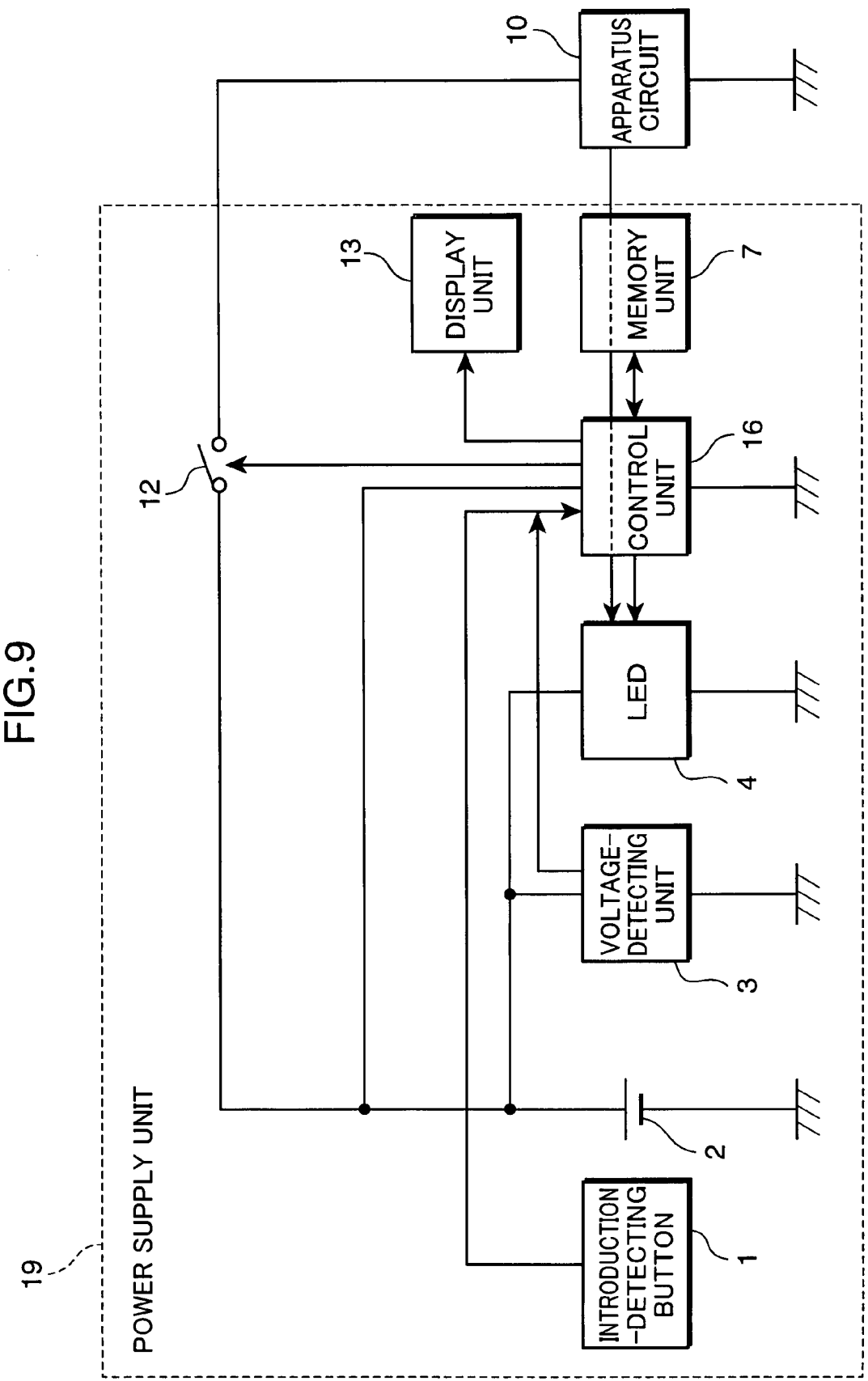
FIG. 9 is a diagram showing an example of the electric apparatus in the fourth embodiment.

Hereinafter, the power supply in the fourth embodiment of the present invention unit will be described. FIG. 9 is a circuit diagram showing an example of the electric apparatus in the fourth embodiment. The electric apparatus shown in FIG. 9 has a power supply unit 19 and an apparatus circuit 10. The power supply unit 19 has an introduction-detecting button 1, a power source 2, a voltage-detecting unit 3, and LED 4, a control unit 16, a memory unit 7, a switch 12, and a display unit 13. The appearance of the personal computer, an example of the electric apparatus having a power supply unit, is the same as that shown in FIG. 2. In addition, the components in the fourth embodiment are indicated by the numerals same as those for the components in the third embodiment, and duplicated description is omitted.

After completion of forced discharge, the control unit 16 stores discharge completion data indicating that forced discharge of the memory unit 7 was complete. In addition, if the discharge completion data indicating completion of the forced discharge is stored in the memory unit 7 when the power source 2 is in use, the control unit 16 causes the display unit 13 to display a message that the forcible discharge was complete.

Thus, the voltage V of power source 2 declines after completion of the forced discharge, similarly to the second embodiment, and, for example, and, if a third person turns on the electric apparatus, the operating time of the electric apparatus becomes shortened. In such a case, the user may consider mistakenly that the operating time of the electric apparatus is shortened by defect of the power source 2. Thus in the fourth embodiment, the memory unit 7 stores the data that the forced discharge was complete, and displays that the forced discharge was complete when the power source 2 is in use again. Thus, the user knows that the electric apparatus is in order. The user can avoid unneeded battery exchange.

The operation of the power supply unit in the fourth embodiment is the operation of the power supply unit in the third embodiment and the processing to store the discharge completion data similar to that in the second embodiment, and the details description will be omitted. The operation of the electric apparatus in the fourth embodiment when it is turned on is the same as that in the second embodiment, and the description is also omitted.

In the description in the third and fourth embodiments, the forced discharge unit consists of a control unit 16 and a switch 12, but the present invention is not particularly restricted thereby, and the switch 12 may be a switching element that is formed on the same circuit board as the control unit 16. Alternatively, at least one of the control unit 16, memory unit 7, switch 12 and voltage-detecting unit 3 may be formed on the same circuit board as the apparatus circuit 10.

Fifth Embodiment

Figure 10:
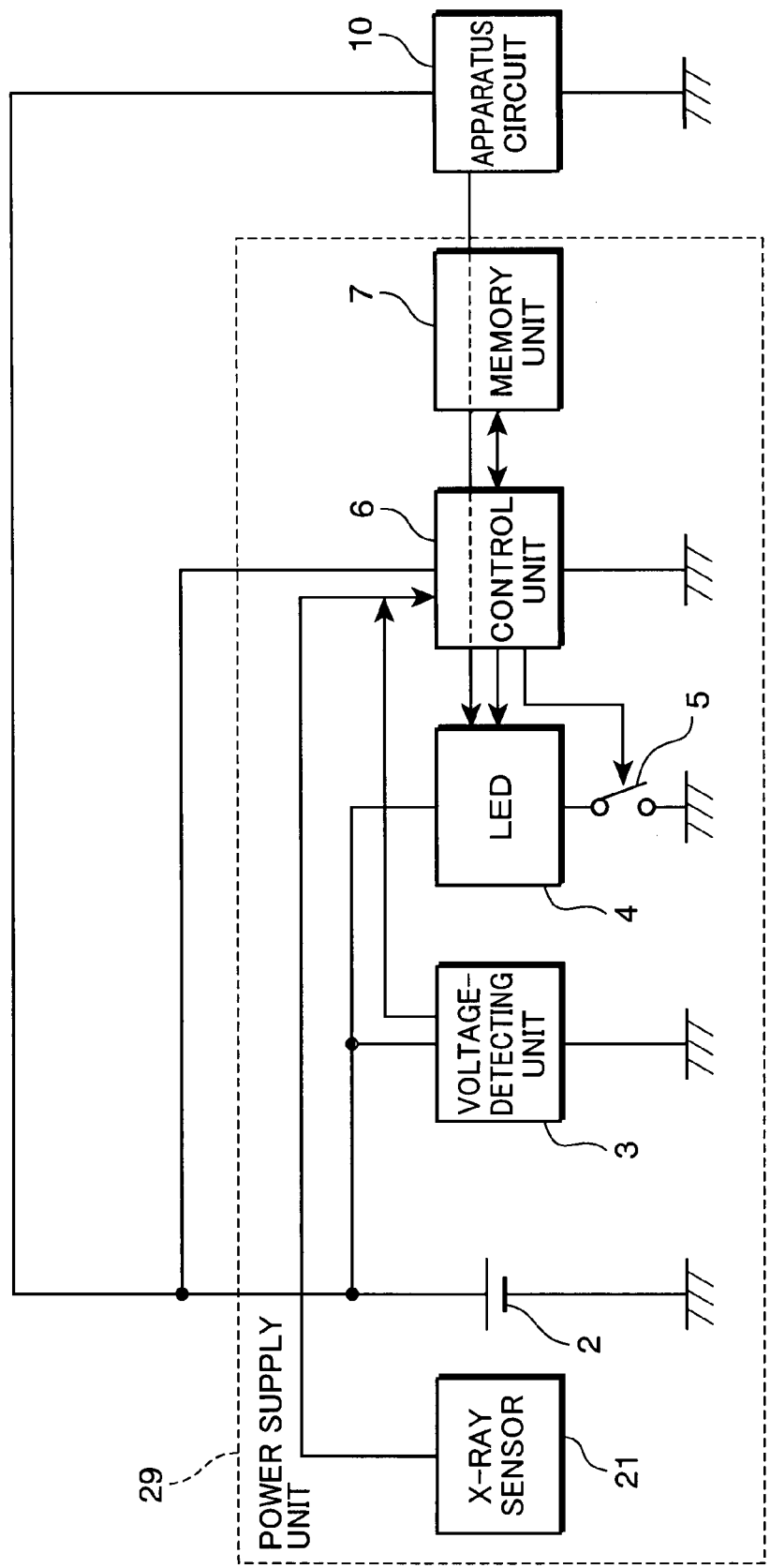
FIG. 10 is a diagram showing an example of the electric apparatus in the fifth embodiment.

Hereinafter, the power supply unit in the fifth embodiment of the present invention will be described. FIG. 10 is a circuit diagram showing an example of the electric apparatus in the fifth embodiment. The electric apparatus shown in FIG. 10 has a power supply unit 29 and an apparatus circuit 10. The power supply unit 29 has an X-ray sensor 21, a power source 2, a voltage-detecting unit 3, an LED 4, a switch 5, a control unit 6, and a memory unit 7. The appearance of the personal computer, an example of the electric apparatus having a power supply unit, is the same as that shown in FIG. 2. In addition, the components in the fifth embodiment are indicated by the numerals same as those for the components in the first embodiment, and duplicated description is omitted.

The X-ray sensor 21 is an example of the introduction-detecting unit, and detects the X ray irradiated to the electric apparatus before introduction of the electric apparatus into vehicle. Upon detecting X ray, the X-ray sensor 21 outputs a detection signal to the control unit 6.

For example, a case of the third person pushing down the introduction-detecting button 1 was described in the first to fourth embodiments described above, but forcible discharge of the power source 2 cannot be performed, if the third person forgets to push down the introduction-detecting button 1 or cannot push it down because the position of the introduction-detecting button 1 is unclear. Thus in the present embodiment, it is possible to avoid the problems, for example, by using an X-ray sensor 21 as the introduction-detecting unit and to make it detect X-ray before introduction of an electric apparatus into vehicle.

Such an X-ray inspection is essential for introduction of an electric apparatus into airplane or international train, and is performed a certain period before introduction thereon. In addition, X ray is not used frequently. Thus, differently from other methods, the sensor is free from concern about false detection of a similar signal if the sensor is sensitive to X-ray, and provides a particular period needed for forced discharge securely, and thus, it is possible to make an electric apparatus introducible into vehicle at high probability, even if the voltage V is not lower than the control-initiating voltage V1 when X-ray is detected. A material converting X ray directly into electrical signal such as selenium may be used for example, as the sensor detecting X-ray.

The operation of the power supply unit in the fifth embodiment is the same as that of the power supply unit in the first embodiment shown in FIG. 3 except the processing in step S1, and thus, duplicated description is omitted. Thus in the fifth embodiment, the control unit 6 judges whether the X-ray sensor 21 detects X-ray in step S1 of FIG. 3. The inspector irradiates X ray on a personal computer before introduction of the personal computer into vehicle. When the X-ray sensor 21 detects X-ray, the X-ray sensor 21 outputs a detection signal to the control unit 6. Upon receiving the detection signal from the X-ray sensor 21, the control unit 6 judges that the X-ray sensor 21 has detected X-ray. If it is judged that the X-ray is not detected (NO in step S1), the judgment processing in step S1 is repeated at a particular time interval until the X-ray is detected. On the other hand, if it is judged that the X-ray is detected (YES in step S1), the processing advances to step S2.

In the present embodiment, although an X-ray sensor is used as an example of the introduction-detecting unit, the present invention is not particularly restricted thereby, and, for example, a sensor detecting a light at a particular wavelength or vibration at a particular frequency may be used instead, if it can detect introduction of an electric apparatus on vehicle previously and automatically.

In addition, the introduction-detecting button 1 used in the power supply unit of the second to fourth embodiment may be replaced with the X-ray sensor 21 in the present embodiment.

Sixth Embodiment

Hereinafter, the power supply unit in the sixth embodiment of the present invention will be described. The configuration of the electric apparatus in the sixth embodiment is the same as that of the electric apparatus in the second embodiment shown in FIG. 4, and will be described below with reference to FIG. 4.

If it is judged that the voltage V of power source 2 detected by the voltage-detecting unit 3 is not lower than the control-initiating voltage V1, the control unit 6 calculates the forced discharge period needed until the voltage V reaches the control-terminating voltage V2. The control unit 6 controls the display unit 11 to display the calculated forced discharge period. The memory unit 7 stores table data showing the relationship between the voltage V and the forced discharge period needed for lowering the voltage V to the control-terminating voltage V2 by discharge.

Typically, if it is judged that the voltage V of power source 2 detected by the voltage-detecting unit 3 is not lower than the control-initiating voltage V1, the control unit 6 reads out the forced discharge period stored as correlated with the voltage V in the table data in memory unit 7.

Figure 11:
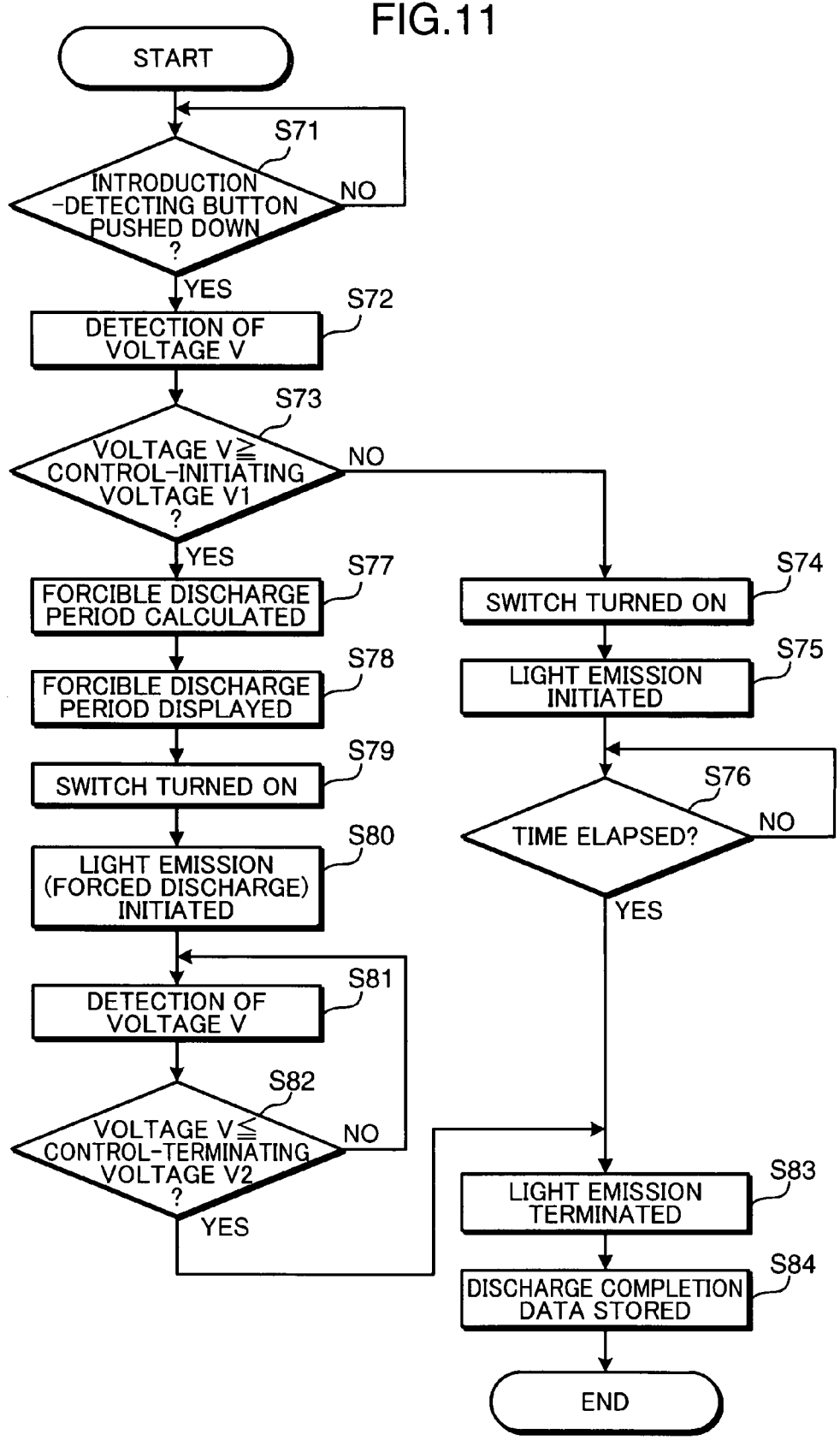
FIG. 11 is a flowchart showing the control algorithm of the power supply unit in the sixth embodiment.

Hereinafter, the operation of the power supply unit in the sixth embodiment will be described. FIG. 11 is a flowchart showing the control algorithm of the power supply unit in the sixth embodiment. The processings in steps S71 to S76 in the power supply unit in the sixth embodiment shown in FIG. 11 are the same as those in steps S21 to S26 of the power supply unit in the second embodiment shown in FIG. 5, and duplicated description thereof is omitted.

If it is judged that the voltage V is not lower than the control-initiating voltage V1 in step S73 (YES in step S73), the control unit 6 reads the forced discharge period correlated with voltage V out of the table data in the memory unit 7 in step S77. The control unit 6 thus calculated the forced discharge period needed until the voltage V of power source 2 detected by the voltage-detecting unit 3 reaches the control-terminating voltage V2.

Then in step S78, the control unit 6 controls the display unit 11 to display the calculated forced discharge period. The display unit 11 displays the forced discharge period. The processings in steps S79 to S84 are the same as those in steps S27 to S32 of the power supply unit in the second embodiment shown in FIG. 5, and thus duplicated description is omitted.

Although the forced discharge period is displayed in the display unit 11 in the present embodiment, the present invention is not restricted thereby, and it may be notified by using an LED 4. In such a case, the control unit 6 turns on the LED 4 in an emission pattern corresponding to the forced discharge period. If the forced discharge period is not longer than a particular period, the control unit 6 turns on the LED 4 in a pattern notifying the fact.

In this way, it is possible to notify the period needed for discharging the power source 2 forcibly until the voltage V of power source 2 reaches the control-terminating voltage V2 in the present embodiment. For example, if it is possible to determine additionally whether an electric apparatus judged to have a voltage V of power source 2 not lower than the control-initiating voltage V1 in the first introduction inspection can be brought into vehicle finally, it would be more convenient, because the following introduction inspection can be eliminated.

For example, when an electric apparatus is brought into an international airplane, the period from the boarding inspection to actual boarding is at least about 30 minutes. It is thus possible to make the third person determine immediately whether the electric apparatus can be brought into vehicle finally, by notifying the person of the period till completion of forced discharge or the fact that the forced discharge will be complete in 30 minutes.

In the first to sixth embodiments, an LED is used as an example of the indicator unit, and it should be assumed that the electric apparatus is in the packaged state when the permission or rejection of introduction of an electric apparatus into vehicle is to be notified to the third person. Accordingly, the notification unit is preferably an LED sending visual notification or an LED in combination with a sound output unit sending auditory notification. The sound output unit outputs buzzer sound or voice.

Seventh Embodiment

Hereinafter, the power supply unit in the seventh embodiment of the present invention will be described. In the seventh embodiment, an LED and a sound output unit are used together as the indicator unit.

Figure 12:
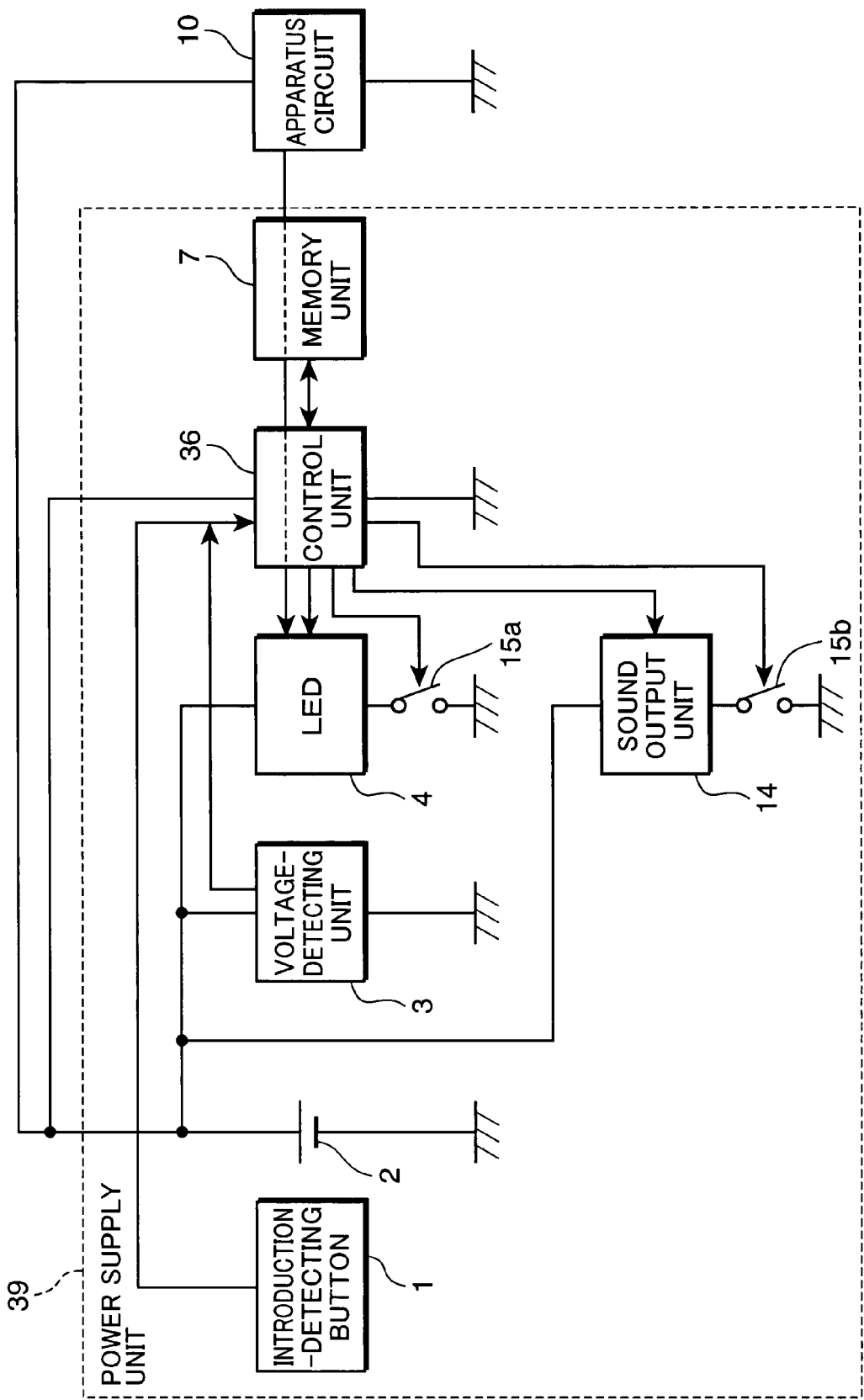
FIG. 12 is a diagram showing an example of the electric apparatus in the seventh embodiment.

FIG. 12 is a circuit diagram showing an example of the electric apparatus in the seventh embodiment. The electric apparatus shown in FIG. 12 has a power supply unit 39 and an apparatus circuit 10. The power supply unit 39 has an introduction-detecting button 1, a power source 2, a voltage-detecting unit 3, a LED 4, a first switch 15a, a control unit 36, a memory unit 7, a sound output unit 14, and a second switch 15b. The appearance of the personal computer, an example of the electric apparatus having a power supply unit, is the same as that shown in FIG. 2. In addition, the components in the seventh embodiment are indicated by the numerals same as those for the components in the first embodiment, and duplicated description is omitted.

The LED 4 emits light with the power supplied from a power source 2. The first switch 15a turns on/off power supply form the power source 2 to the LED 4. The sound output unit 14 outputs sound with the power supplied from the power source 2. The second switch 15b turns on/off power supply from the power source 2 to the sound output unit 14.

If the voltage V of power source 2 detected by the voltage-detecting unit 3 is lower than the control-initiating voltage V1, the control unit 36 turns on the second switch 15b and causes sound output unit 14 to notify by sound that the power source 2 is ready to be brought into vehicle.

Alternatively if the voltage V of power source 2 detected by the voltage-detecting unit 3 is not lower than the control-initiating voltage V1, the control unit 36 recognizes that the power source 2 is in the state demanding forcible discharge, and turns on the first switch 15a, allowing power supply from the power source 2 to the LED 4, and causes the LED 4 to notify that the electric apparatus is in the state prohibiting introduction into vehicle and the power source 2 is discharged forcibly until the voltage of power source 2 detected by the voltage-detecting unit 3 reaches the control-terminating voltage V2.

Figure 13:
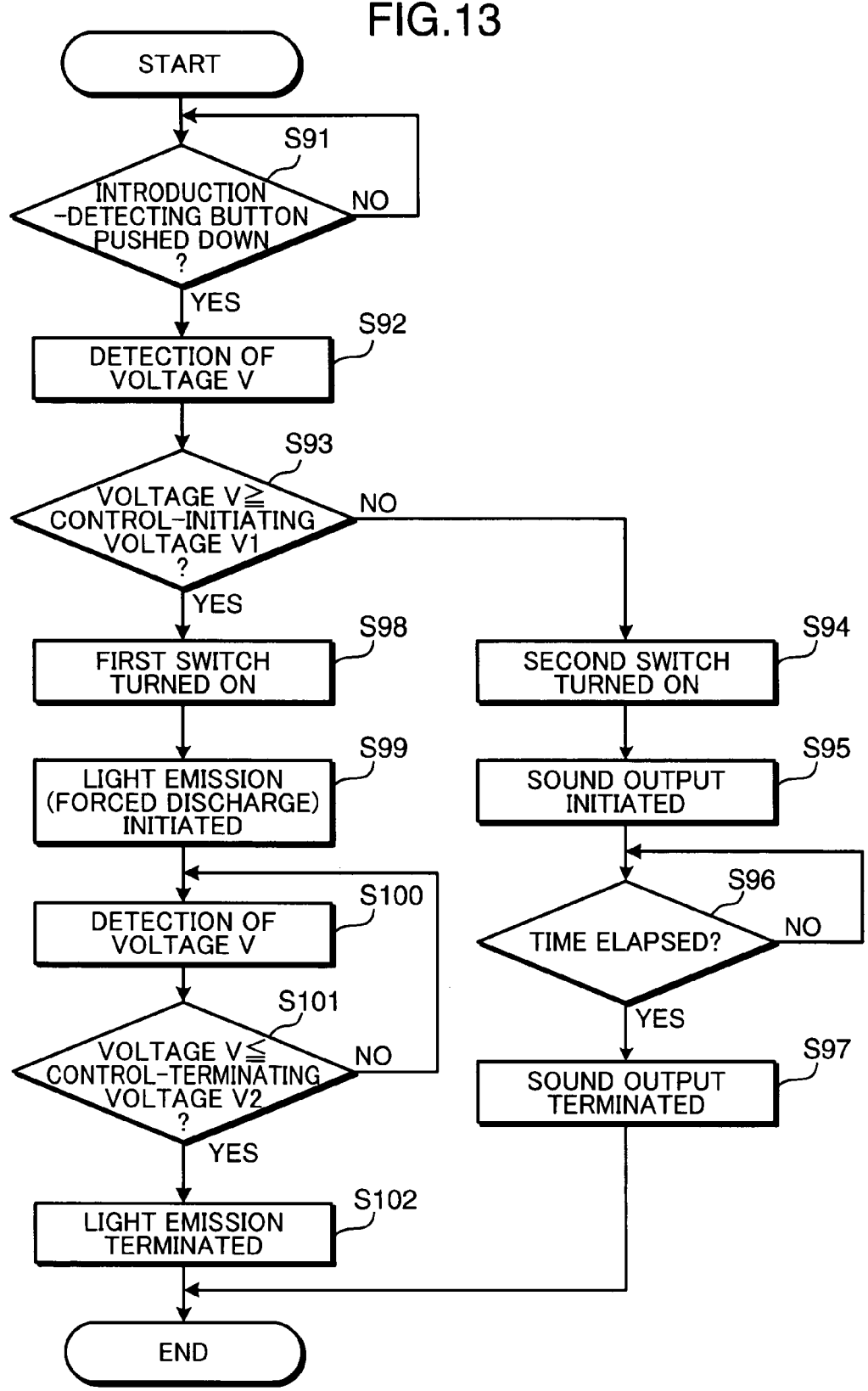
FIG. 13 is a flowchart showing the control algorithm of the power supply unit in the seventh embodiment.

Hereinafter, the operation of the power supply unit in the seventh embodiment will be described. FIG. 13 is a flowchart showing the control algorithm of the power supply unit in the seventh embodiment. The processings in steps S91 to S93 of the power supply unit in the seventh embodiment shown in FIG. 13 are the same as those in the steps S1 to S3 of the power supply unit in the first embodiment shown in FIG. 3, and duplicated description is omitted.

If it is judge that the voltage V is lower than the control-initiating voltage V1 (NO in step S93), the control unit 36 turns on the second switch 15b in step S94. Then in step S95, the control unit 36 outputs a control signal to the sound output unit 14 and sound out of the sound output unit 14. The sound output unit 14 outputs sound such as buzzer sound according to the control signal inputted from the control unit 36, initiating notification that the power source 2 is satisfactory at the present moment.

Then in step S96, the control unit 36 determines whether the time has elapsed for a particular time. The period for a particular time is the sound output period of sound output unit 14, and normally set to a relatively short period noticeable by the third person, for example of 10 seconds. If it is judged that the time has not elapsed for a particular time (NO in step S96), the judgment processing in step S96 is repeated until the time elapses for a particular time.

On the other hand, if it is judged that the time has elapsed for a particular time (YES in step S96), the control unit 36 turns off the second switch 15b, terminating the sound output from the sound output unit 14 in step S97.

If the voltage V is judged to be not lower than the control-initiating voltage V1 in step S93 (YES in step S93), the control unit 36 turns on the first switch 15a in step S98. The processings in steps S99 to S101 are the same as those in steps S8 to S10 in FIG. 3, and duplicated description is omitted.

If the voltage V is judged not higher than the control-terminating voltage V2 in step S101 (YES in step S101), the control unit 36 turns off the first switch 15a, terminating light emission of the LED 4 and forced discharge in step S102.

In this way, it is possible to avoid noise during discharge during introduction inspection, by using an auditory sound output unit 14 for notification that the power source 2 is ready to be brought into vehicle and by using a visual LES 4 for forcible discharge.

The system in the seventh embodiment may have the display unit 11 in the second embodiment additionally, the switch 12 in the third embodiment replacing the switch 5, or the X-ray sensor 21 in the fifth embodiment replacing the introduction-detecting button 1.

So far, favorable embodiments according to the present invention have been described, by taking personal computer as an example of the electric apparatus, but the present invention is not restricted thereby, if it is an eclectic apparatus having an indicator unit, and examples thereof include portable television set, digital still camera, portable music-reproducing device, and electric tool, as well as electric apparatuses not powered by an electric power source such as electric vehicle and electric scooter.

The typical embodiments described above mainly include inventions in the following configurations.

An aspect of the present invention is a power supply unit for supply of power to an electric apparatus, comprising an indicator unit, a power source containing a nonaqueous electrolyte secondary battery, an introduction-detecting unit for detecting introduction of the electric apparatus into vehicle for transportation of the electric apparatus, a voltage-detecting unit for detecting the voltage of the power source, a memory unit for storing a first voltage and a second voltage lower than the first voltage, a judgment unit for determining whether the voltage of the power source detected by the voltage-detecting unit is not lower than the first voltage, if the introduction of the electric apparatus into vehicle is detected previously by the introduction-detecting unit, a forced discharge unit for causing the indicator unit to notify that the electric apparatus is in the state prohibiting introduction thereof into vehicle and forcibly discharging the power source until the voltage of the power source detected by the voltage-detecting unit reaches the second voltage by supplying power from the power source to the indicator unit, if the voltage of the power source is judged not lower than the first voltage by the judgment unit.

Another aspect of the present invention is an electric apparatus, comprising an indicator unit, a power source containing a nonaqueous electrolyte secondary battery, an introduction-detecting unit for detecting introduction of the electric apparatus into vehicle for transportation of the electric apparatus, a voltage-detecting unit for detecting the voltage of the power source, a memory unit for storing a first voltage and a second voltage lower than the first voltage, a judgment unit for determining whether the voltage of the power source detected by the voltage-detecting unit is not lower than the first voltage, a forced discharge unit for causing the indicator unit to notify that the electric apparatus is in the state prohibiting introduction thereof into vehicle and forcibly discharging the power source until the voltage of the power source detected by the voltage-detecting unit reaches the second voltage by supplying power from the power source to the indicator unit, if the voltage of the power source is judged not lower than the first voltage by the judgment unit, and an apparatus circuit to which power is supplied from the power source.

In these configurations, it is possible to determine whether the voltage of a power source containing a nonaqueous electrolyte secondary battery is the first voltage or more, when introduction of an electric apparatus into vehicle is detected in advance. If the voltage of the power source is judged to be not lower than the first voltage, power is supplied from the power source to the indicator unit, notifying that the electric apparatus is in the state prohibiting introduction into vehicle, and the power source is discharged forcibly until the voltage of the power source reaches a second voltage smaller than the first voltage.

Thus because power is supplied from the power source to the indicator unit and the electric apparatus is discharged forcibly discharge, it is possible to notify the third person that the electric apparatus is in the state prohibiting introduction into vehicle and to make the electric apparatus in the state safely introducible into vehicle.

The power supply unit above desirably has a notification control unit for causing the indicator unit to notify that the electric apparatus is in the state ready to be brought into vehicle by supplying power from the power source to the indicator unit for a particular time of period, if the voltage of the power source is judged lower than the first voltage by the judgment unit.

In the configuration, if the voltage of the power source is judged lower than the first voltage, power is supplied from the power source to the indicator unit for a particular time, and the electric apparatus is in the state allowing introduction into vehicle is notified. It is thus possible to notify the third person previously that the electric apparatus is in the state resistant to deterioration when installed in the vehicle.

In the power supply unit above, the notification control unit preferably causes the indicator unit to notify that the electric apparatus is in the state ready to be brought into vehicle, in a manner different from the notification method in the indicator unit when the power source is discharged forcibly by the forced discharge unit.

In the configuration, the electric apparatus is in the state allowing introduction into vehicle is notified, in a manner different from the notification method in the indicator unit when the power source is discharged forcibly. Thus, it is possible to determine whether the electric apparatus can be brought into vehicle, easily by confirming the notification method.

In the power supply unit above, if the voltage of the power source is judged not lower than the first voltage by the judgment unit, the forced discharge unit preferably, causes the indicator unit to notify that the electric apparatus is in the state prohibiting introduction thereof into vehicle and forcibly discharges the power source until the voltage of the power source detected by the voltage-detecting unit reaches the second voltage by automatically supplying power from the power source to the indicator unit.

In the configuration, if the voltage of the power source is judged to be not lower than the first voltage, power is supplied automatically from the power source to the indicator unit, the fact that the electric apparatus is in the state prohibiting introduction into vehicle is notified, and the power source is discharged forcibly until the voltage of the power source reaches the second voltage. Thus, automatically power supply from the power source to the indicator unit eliminates the labor of the operator.

In the power supply unit above, the forced discharge unit preferably has a switch for turning on/off power supply from the power source to the indicator unit, and a discharge control unit for turning the switch on if the voltage of the power source is judged not lower than the first voltage by the judgment unit and turning the switch off if the voltage of the power source detected by the voltage-detecting unit reaches the second voltage, when introduction the electric apparatus into vehicle is detected by the introduction-detecting unit.

Power supply from the power source to the indicator unit is turned on and off by the switch in the configuration. If introduction of an electric apparatus into vehicle is previously detected and the switch is turned on whether voltage of the power source is judged not lower than the first voltage, and turned off when the voltage of the power source reaches the second voltage. Thus, it is possible to control power supply from the power source to the indicator unit easily by switching the switch on and off.

Preferably, the power supply unit above has a display unit additionally; the discharge control unit stores discharge completion data indicating that discharge is complete in the memory unit after forcible discharge of the power source; and, a message according to the discharge completion data is displayed in the display unit, when power is applied to the electric apparatus.

In the configuration, discharge completion data indicating completion of discharge is stored in the memory unit after forcible discharge of the power source, and, if power is applied to the electric apparatus, message according to the discharge completion data is displayed in the display unit. Accordingly, it is possible for the user to confirm that the shortening of the operating time of the electric apparatus not due to troubles of the power source and to avoid unneeded battery exchange by the user.

The forced discharge unit in the power supply unit preferably has a switch turning on/off power supply from the power source to the electric apparatus, and a discharge control unit turning the switch on if the voltage of the power source is judged not lower than the first voltage by the judgment unit, when power supply from the power source to the electric apparatus is turned off and when introduction of the electric apparatus into vehicle is detected by the introduction-detecting unit.

Power supply form the power source to the electric apparatus is turned on and off by the switch in the configuration. And when power supply form the power source to the electric apparatus is disconnected, introduction of an electric apparatus into vehicle is detected previously, and the voltage of the power source is not lower than the first voltage, the switch is turned on. Accordingly, it is possible to control power supply from the power source to the electric apparatus easily by turning the switch on and off.

In the power supply unit above, the discharge control unit preferably turns the switch off when the voltage of the power source detected by the voltage-detecting unit reaches the second voltage. In the configuration, it is possible to prevent undesirable decrease in residual capacity of the power source even after completion of the forced discharge, because the switch is turned off when the voltage of the power source reaches the second voltage.

The introduction-detecting unit in the power supply unit preferably has a button allowing detection of introduction of an electrical apparatus into vehicle in advance as it is pushed downward by the user before the electric apparatus is brought into the vehicle. In the configuration, as the button is pushed down by the user before introduction of an electric apparatus into vehicle, it is possible to detect introduction of an electric apparatus into vehicle easily.

The introduction-detecting unit in the power supply unit above preferably has a sensor for detecting introduction of the electric apparatus into vehicle previously and automatically. In the configuration, because introduction of an electric apparatus into vehicle is detected previously and automatically, it is possible to detect introduction of an electric apparatus into vehicle more easily.

The sensor in the power supply unit preferably detects X ray irradiation before the electric apparatus is brought into the vehicle. In the configuration, X ray irradiated is detected before the electric apparatus is brought into vehicle. Because the X-ray is not used frequently, it is possible to detect introduction of an electric apparatus into vehicle at high accuracy without false detection of similar signals, if the sensor is sensitive to the X ray.

The forced discharge unit in the power supply unit above preferably has a discharge period-calculating unit for calculating the forced discharge period until the voltage of the power source detected by the voltage-detecting unit reaches the second voltage if the voltage of the power source is judged not lower than the first voltage by the judgment unit, and a discharge-period notification control unit for causing the indicator unit to notify the forced discharge period calculated by the discharge period-calculating unit.

In the configuration, when the voltage of the power source is judged to be not lower than the first voltage or more, the forced discharge period need until the voltage of the power source reaches the second voltage is calculated, and the calculated forced discharge period is notified. Accordingly, it is possible to know the period until the electric apparatus becomes ready to be introduced into vehicle, by examining the forced discharge period.

Preferably in the power supply unit above, the first voltage is 45% or more and 55% or less of the rated voltage of the power source, and the second voltage, 25% or more and 35% or less of the rated voltage of the power source.

In the configuration, if the voltage of the power source is 45% or more and 55% or less of the rated voltage of the power source, it is possible to reduce the voltage of the power source to 25% or more and 35% or less of the rated voltage of the power source.

The indicator unit in the power supply unit preferably includes an emission unit for emitting light with the power supplied from the power source. In the configuration, because power is supplied from the power source to the emission unit and the electric apparatus is discharged forcibly, it is possible to notify the third person that the electric apparatus is in the state prohibiting introduction into vehicle and to make the electric apparatus in the state safely introducible into vehicle.

The indicator unit in the power supply unit preferably has a sound output unit for outputting sound with the power supplied from the power source. In the configuration, because power is supplied from the power source to the sound output unit and the electric apparatus is discharged forcibly, it is possible to notify the third person that the electric apparatus is in the state prohibiting introduction into vehicle and to make the electric apparatus in the state safely introducible into vehicle.

The indicator unit in the power supply unit preferably has an emission unit for emitting light with the power supplied from the power source and a sound output unit for outputting sound with the power supplied from the power source; if the voltage of the power source is judged lower than the first voltage by the judgment unit, the notification control unit causes the sound output unit to notify that the electric apparatus is in the state introducible into vehicle by supplying power from the power source to the sound output unit for a particular time; and if the voltage of the power source is judged not lower than the first voltage by the judgment unit, the forced discharge unit causes the emission unit to notify that the electric apparatus is in the state introducible into vehicle and forcibly discharges the power source until the voltage of the power source detected by the voltage-detecting unit reaches the second voltage by supplying power from the power source to the emission unit.

In the configuration, if the voltage of the power source is judged lower than the first voltage, power is supplied from the power source to the sound output unit for a particular time, and the sound output unit notifies that the electric apparatus is in the state allowing introduction into vehicle. If the voltage of the power source is judged not lower than the first voltage, power is supplied from the power source to the emission unit; the fact that electric apparatus is in the state prohibiting introduction into vehicle is notified by the emission unit; and the power source is discharged forcibly until the voltage of the power source reaches the second voltage. Thus when the power source is discharged forcibly, the fact is notified with the emission from the emission unit, preventing generation of noise during discharge.

The apparatus circuit in the electric apparatus above is preferably formed on the same circuit board as at least one of the voltage-detecting unit, the memory unit, and the forced discharge unit. In the configuration, it is possible to reduce the size of the electric apparatus, because at least one of the voltage-detecting unit, the memory unit, and the forced discharge unit is formed on the same circuit board with the apparatus circuit.

The power supply unit and the electric apparatus according to the present invention allow introduction of a nonaqueous electrolyte secondary battery, a high-capacity power source, into vehicle in the safe state, and thus, are superior in user convenience. For that reason, they may be applied to general power supply units for electric apparatuses and thus have extremely high applicability.

This application is based on Japanese Patent application serial no. 2006-256657 filed in Japan Patent Office on Sep. 22, 2006, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A power supply unit for supply of power to an electric apparatus, comprising
   an indicator unit,
   a power source containing a nonaqueous electrolyte secondary battery,
   an introduction-detecting unit for detecting introduction of the electric apparatus into vehicle for transportation of the electric apparatus,
   a voltage-detecting unit for detecting the voltage of the power source,
   a memory unit for storing a first voltage and a second voltage lower than the first voltage,
   a judgment unit for determining whether the voltage of the power source detected by the voltage-detecting unit is not lower than the first voltage, if the introduction of the electric apparatus into vehicle is detected previously by the introduction-detecting unit, and
   a forced discharge unit for causing the indicator unit to notify that the electric apparatus is in the state prohibiting introduction thereof into vehicle and forcibly discharging the power source until the voltage of the power source detected by the voltage-detecting unit reaches the second voltage by supplying power from the power source to the indicator unit, if the voltage of the power source is judged not lower than the first voltage by the judgment unit.

2. The power supply unit according to claim 1, further comprising a notification control unit for causing the indicator unit to notify that the electric apparatus is in the state ready to be brought into vehicle by supplying power from the power source to the indicator unit for a particular time of period, if the voltage of the power source is judged lower than the first voltage by the judgment unit.

3. The power supply unit according to claim 2, wherein the notification control unit causes the indicator unit to notify that the electric apparatus is in the state ready to be brought into vehicle in a manner different from the notification method in the indicator unit when the power source is discharged forcibly by the forced discharge unit.

4. The power supply unit according to claim 1, wherein the forced discharge unit causes the indicator unit to notify that the electric apparatus is in the state prohibiting introduction thereof into vehicle and forcibly discharges the power source until the voltage of the power source detected by the voltage-detecting unit reaches the second voltage by automatically supplying power from the power source to the indicator unit, if the voltage of the power source is judged not lower than the first voltage by the judgment unit.

5. The power supply unit according to claim 1, wherein the forced discharge unit includes
   a switch for turning on/off power supply from the power source to the indicator unit, and
   a discharge control unit for turning the switch on if the voltage of the power source is judged not lower than the first voltage by the judgment unit and turning the switch off if the voltage of the power source detected by the voltage-detecting unit reaches the second voltage, when introduction of the electric apparatus into vehicle is detected by the introduction-detecting unit.

6. The power supply unit according to claim 5, further comprising a display unit, wherein the discharge control unit stores discharge completion data indicating that discharge is complete in the memory unit after forcible discharge of the power source and causes the display unit to display a message based on the discharge completion data when the power is applied to the electric apparatus.

7. The power supply unit according to claim 1, wherein the forced discharge unit includes
   a switch for turning on/off power supply from the power source to the electric apparatus, and
   a discharge control unit for turning the switch on when power supply from the power source to the electric apparatus is turned off, when introduction of the electric apparatus into vehicle is detected by the introduction-detecting unit, and if the voltage of the power source is judged not lower than the first voltage by the judgment unit.

8. The power supply unit according to claim 7, wherein the discharge control unit turns the switch off if the voltage of the power source detected by the voltage-detecting unit reaches the second voltage.

9. The power supply unit according to claim 1, wherein the introduction-detecting unit includes a button for detecting introduction of the electronic device into vehicle previously, as pushed down by the user, before the electric apparatus is brought into the vehicle.

10. The power supply unit according to claim 1, wherein the introduction-detecting unit includes a sensor for detecting introduction of the electric apparatus into vehicle previously and automatically.

11. The power supply unit according to claim 10, wherein the sensor detects X ray irradiation before the electric apparatus is brought into the vehicle.

12. The power supply unit according to claim 1, wherein the forced discharge unit includes
    a discharge period-calculating unit for calculating the forced discharge period needed until the voltage of the power source detected by the voltage-detecting unit reaches the second voltage if the voltage of the power source is judged not lower than the first voltage by the judgment unit, and
    a discharge-period notification control unit for causing the indicator unit to notify the forced discharge period calculated by the discharge period-calculating unit.

13. The power supply unit according to claim 1, wherein the first voltage is 45% or more and 55% or less of the rated voltage of the power source, and the second voltage is 25% or more and 35% or less of the rate voltage of the power source.

14. The power supply unit according to claim 1, wherein the indicator unit includes an emission unit for emitting light with the power supplied from the power source.

15. The power supply unit according to claim 1, wherein the indicator unit includes a sound output unit for outputting sound with the power supplied from the power source.

16. The power supply unit according to claim 2, wherein: the indicator unit includes an emission unit for emitting light with the power supplied from the power source and a sound output unit for outputting sound with the power supplied from the power source;

the notification control unit, if the voltage of the power source is judged lower than the first voltage by the judgment unit, causes the sound output unit to notify that the electric apparatus is in the state ready to be brought into vehicle by supplying power from the power source to the sound output unit for a particular time; and the forced discharge unit, if the voltage of the power source is judged not lower than the first voltage by the judgment unit, causes the emission unit to notify that the electric apparatus is in the state prohibiting introduction thereof into vehicle and forcibly discharges the power source until the voltage of the power source detected by the voltage-detecting unit reaches the second voltage by supplying power from the power source to the emission unit.

17. An electric apparatus, comprising an indicator unit, a power source containing a nonaqueous electrolyte secondary battery, an introduction-detecting unit for detecting introduction of the electric apparatus into vehicle for transportation of the electric apparatus, a voltage-detecting unit for detecting the voltage of the power source, a memory unit for storing a first voltage and a second voltage lower than the first voltage, a judgment unit for determining whether the voltage of the power source detected by the voltage-detecting unit is not lower than the first voltage, if the introduction of the electric apparatus into vehicle is detected previously by the introduction-detecting unit, a forced discharge unit for causing the indicator unit to notify that the electric apparatus is in the state prohibiting introduction thereof into vehicle and forcibly discharging the power source until the voltage of the power source detected by the voltage-detecting unit reaches the second voltage by supplying power from the power source to the indicator unit, if the voltage of the power source is judged not lower than the first voltage by the judgment unit, and an apparatus circuit to which power is applied from the power source.

18. The electric apparatus according to claim 17, wherein the apparatus circuit is formed on the same circuit board at least one of the voltage-detecting unit, the memory unit, and the forced discharge unit.

* * * * *